US 8,825,738 B2

(12) United States Patent
Naono et al.

(10) Patent No.: US 8,825,738 B2
(45) Date of Patent: Sep. 2, 2014

(54) SYSTEM, SERVER, INFORMATION TERMINAL OPERATING SYSTEM, MIDDLEWARE, INFORMATION COMMUNICATION DEVICE, CERTIFICATION METHOD, AND SYSTEM AND APPLICATION SOFTWARE

(75) Inventors: Norihiko Naono, Tokyo (JP); Tomohisa Ota, Tokyo (JP)

(73) Assignee: Ripplex Inc., Tokyo (JP)

( * ) Notice: Subject to any disclaimer, the term of this patent is extended or adjusted under 35 U.S.C. 154(b) by 734 days.

(21) Appl. No.: 11/961,646

(22) Filed: Dec. 20, 2007

(65) Prior Publication Data

US 2008/0263175 A1    Oct. 23, 2008

(30) Foreign Application Priority Data

Dec. 20, 2006 (JP) .................. P2006-343444
Feb. 9, 2007 (JP) .................. P2007-31143
Apr. 17, 2007 (JP) .................. P2007-107756

(51) Int. Cl.
G06F 15/16 (2006.01)
H04L 29/08 (2006.01)
H04L 29/06 (2006.01)

(52) U.S. Cl.
CPC .............. *H04L 67/306* (2013.01); *H04L 67/04* (2013.01); *H04L 63/12* (2013.01)
USPC ............... 709/203; 709/201; 709/217; 726/2; 726/26; 726/28

(58) Field of Classification Search
CPC ........ H04L 67/04; H04L 67/306; H04L 63/12
USPC ......................... 709/204–205, 207, 217–219
See application file for complete search history.

(56) References Cited

U.S. PATENT DOCUMENTS 4,405,829 A   9/1983   Rivest et al. .................. 178/22.1
5,117,458 A   5/1992   Takaragi et al. .............. 380/228
(Continued)

FOREIGN PATENT DOCUMENTS

JP    09-319629       12/1997
JP    2000-227879     8/2000
(Continued)

OTHER PUBLICATIONS

Roland Alden et al., "Electronic Business Card Version 2.1"., Versit Consortium Specification, Sep. 18, 1996—IBM & Lucent Technologies, Inc. & Siemens.

(Continued)

*Primary Examiner* — Thomas Dailey
*Assistant Examiner* — Nam Tran
(74) *Attorney, Agent, or Firm* — Winston & Strawn LLP

(57) ABSTRACT

A system having a server and an information terminal of A which records A's personal information Pa and B's personal information Pb', an information terminal of B which records A's personal information Pa and B's personal information Pb'. B's information terminal generates a calculation result F(Pa',Pb) via the calculation of Pa' and Pb, sends F(Pa',Pb) to a server. The server correlates B's identification tag with F(Pa',Pb) and records it. A's information terminal forms F(Pa, Pb') calculated via the calculation of Pb' and Pa and sends F(Pa,Pb') to the server. The server searches for a calculation result which matches F(Pa,Pb') and by detecting a match between F(Pa',Pb) and F(Pa,Pb') detects B's identification tag which has been correlated with F(Pa',Pb) and detected B's identification tag is sent to A's information terminal.

20 Claims, 13 Drawing Sheets

(56) References Cited

U.S. PATENT DOCUMENTS

| | | | | |
|---|---|---|---|---|
| 5,227,613 | A | 7/1993 | Takagi et al. | 235/380 |
| 5,535,276 | A | 7/1996 | Ganesan | 713/155 |
| 5,560,005 | A | 9/1996 | Hoover et al. | 395/600 |
| 5,796,833 | A | 8/1998 | Chen et al. | 713/156 |
| 5,966,449 | A | 10/1999 | Iwamura et al. | 380/44 |
| 6,587,691 | B1 | 7/2003 | Granstam et al. | 455/456 |
| 6,665,837 | B1 | 12/2003 | Dean et al. | 715/501.1 |
| 6,820,204 | B1 | 11/2004 | Desai et al. | 726/6 |
| 7,069,308 | B2 | 6/2006 | Abrams | 709/218 |
| 7,080,104 | B2 | 7/2006 | Ring et al. | 707/203 |
| 7,434,054 | B2 | 10/2008 | Zick | 713/171 |
| 7,567,674 | B2 | 7/2009 | Nishimoto et al. | 380/281 |
| 7,603,413 | B1 * | 10/2009 | Herold et al. | 709/204 |
| 2002/0032857 | A1 | 3/2002 | Kon et al. | 713/156 |
| 2002/0103765 | A1 | 8/2002 | Ohmori | 705/67 |
| 2002/0107807 | A1 | 8/2002 | Ketonen et al. | 705/51 |
| 2002/0178354 | A1 | 11/2002 | Ogg et al. | 713/155 |
| 2003/0126436 | A1 | 7/2003 | Greenberg et al. | 713/168 |
| 2003/0135507 | A1 | 7/2003 | Hind et al. | 707/100 |
| 2003/0140235 | A1 | 7/2003 | Immega et al. | 713/186 |
| 2003/0147537 | A1 | 8/2003 | Jing et al. | 380/277 |
| 2003/0149662 | A1 | 8/2003 | Shore | 705/39 |
| 2003/0158860 | A1 | 8/2003 | Caughey | 707/200 |
| 2004/0064687 | A1 | 4/2004 | Pfitzmann et al. | 713/100 |
| 2004/0093317 | A1 | 5/2004 | Swan | 707/1 |
| 2004/0148275 | A1 * | 7/2004 | Achlioptas | 707/3 |
| 2005/0010680 | A1 | 1/2005 | Zick et al. | 709/237 |
| 2005/0071687 | A1 | 3/2005 | Pathakis et al. | 713/202 |
| 2006/0003806 | A1 | 1/2006 | Weber et al. | 455/561 |
| 2006/0015944 | A1 | 1/2006 | Fields | 726/27 |
| 2006/0036857 | A1 | 2/2006 | Hwang | 713/168 |
| 2006/0155733 | A1 | 7/2006 | John et al. | 707/101 |
| 2006/0179066 | A1 | 8/2006 | Shipp et al. | 707/100 |
| 2006/0224675 | A1 | 10/2006 | Fox et al. | 709/206 |
| 2006/0259781 | A1 | 11/2006 | Saeki et al. | 713/189 |
| 2006/0293083 | A1 | 12/2006 | Bowen | 455/558 |
| 2007/0027921 | A1 | 2/2007 | Alvarado et al. | 707/104.1 |
| 2007/0033217 | A1 | 2/2007 | Basner | 707/102 |
| 2007/0058658 | A1 | 3/2007 | Ruckart | 370/444 |
| 2007/0061245 | A1 | 3/2007 | Ramer et al. | 705/37 |
| 2008/0022361 | A1 | 1/2008 | Bharadwaj et al. | 726/2 |
| 2008/0077795 | A1 | 3/2008 | MacMillan | 713/169 |
| 2008/0219427 | A1 | 9/2008 | Naono et al. | 379/218.01 |
| 2008/0222543 | A1 | 9/2008 | Naono et al. | 715/764 |
| 2008/0288462 | A1 | 11/2008 | Naono et al. | 707/3 |
| 2008/0313723 | A1 | 12/2008 | Naono et al. | 726/7 |
| 2008/0317248 | A1 | 12/2008 | Naono et al. | 380/255 |
| 2008/0320105 | A1 | 12/2008 | Naono et al. | 709/219 |
| 2009/0132821 | A1 | 5/2009 | Matsuzaki | 713/170 |
| 2009/0171978 | A1 | 7/2009 | Naono et al. | 707/10 |
| 2009/0287922 | A1 | 11/2009 | Herwono et al. | 713/155 |
| 2010/0023510 | A1 | 1/2010 | Naono et al. | 707/5 |

FOREIGN PATENT DOCUMENTS

| | | |
|---|---|---|
| JP | 2001-116579 | 4/2001 |
| JP | 2002-538698 | 11/2002 |
| JP | 2003-316708 | 11/2003 |
| JP | 2004-199261 | 7/2004 |
| JP | 2005-164409 | 6/2005 |
| JP | 2006-166117 | 6/2006 |
| JP | 2006-244095 | 9/2006 |
| WO | WO 00/51391 | 8/2000 |

OTHER PUBLICATIONS

Non-Final Office Action, U.S. Appl. No. 12/139,024, Dated Oct. 26, 2010.

Non-Final Office Action, U.S. Appl. No. 12/044,770, Dated Dec. 29, 2010.

Non-Final Office Action, U.S. Appl. No. 12/122,254, Dated Feb. 8, 2011.

Non-Final Office Action, U.S. Appl. No. 12/143,574, Dated Mar. 2, 2011.

Office Action with English Translation of JP2007-107756 mailed Aug. 7, 2012.

English Abstract—Yutaka Matsuoka et al, "Utilization of Social Network Extraction for Event Space Information Support", Conference of the Association, of Artificial Intelligence, vol. 2004, No. 3CI-04, pp. 1-4, Jun. 2004.

Final Office Action, U.S. Appl. No. 12/122,254, Dated Jul. 20, 2011.

* cited by examiner

SYSTEM, SERVER, INFORMATION TERMINAL OPERATING SYSTEM, MIDDLEWARE, INFORMATION COMMUNICATION DEVICE, CERTIFICATION METHOD, AND SYSTEM AND APPLICATION SOFTWARE

CROSS REFERENCE TO RELATED APPLICATION

This application is based upon and claims the benefit of priority from the prior Japanese Patent Application No. 2006-343444, filed on Dec. 20, 2006, Japanese Patent Application No. 2007-31143, filed on Feb. 9, 2007, and Japanese Patent Application No. 2007-107756, filed on Apr. 17, 2007 the entire contents of which are incorporated herein by reference.

TECHNICAL FIELD

This invention relates to systems, servers, information terminals, operating systems, middleware, information communication devices, certification methods and application software.

DESCRIPTION OF THE RELATED ART

In recent years, various information terminals such as personal computers, telephones and game consoles have become connected to an IP network. The Internet has been used to disclose information to the world over a server represented until recently mainly by the WEB. The internet has become used as a communication method represented in services such as IP telecommunications and network games which can exchange personal information limited to certain addresses over servers or peer to peer (P2P) networks Further, the connection of various consumer devices such as digital cameras, video cameras, portable type music players, video recorders and navigation systems to IP networks is continuing to develop and it is predicted that such information terminals will be used as the main method of communication between individuals.

In order to realize and exchange of data or communication using one of these various information terminals which are connected to a network it is necessary for the user to search and find another user willing to communicate over the network.

With most services, the exchange of data and communication between individuals is conducted on a server operated by a service provider. Therefore, upon receiving certification at the time of logging on to the server, a user can specify and communicate with another user wishing to communicate by searching directly for personal information which has been disclosed and registered to the service provider in advance by another user In addition, with services which realize an exchange of data and communication between individuals via an architecture which does not rely on a server such as peer to peer (P2P), when searching for a partner wishing to communicate, a query is sent to search for personal information disclosed to members of this service by the partner to a direct communication node (a nearest node). If the node does not have the personal information which is the object of this search query, this node sends the query to a further nearest node. By repeating sending of the query until finding a node which has the personal information which is the object of this search query, the partner who wishes to communicate is specified, that partner's network ID is obtained and communication is established.

Furthermore, as described above, following a search for personal information on the server, when agreement of private information is detected on the server's database, each network ID is notified to the user who requires communication and data transfer via P2P is established by direct connection between the users and what is known as a Hybrid-Type service is also proposed.

The main problem which should be solved related to a search for personal information on a P2P network and/or a server and obtaining a network ID and specification of a communication partner when exchanging data or communication between individuals has the following two points.

Firstly, there is a problem concerning the security of private information. Every user of this service can make an inquiry of the personal information which the user of this type of service registers in advance as a potential object of a search and when the inquired information and the information on the database matches the result is notified to the user requesting the information. Therefore, it is possible for an unspecified number of users to obtain private information which has been registered. Furthermore, it is possible to construct, for example, a list of users of this service if this search object is scanned with something such as routine software. When users of this service provider, it can be said that the personal information used by a search is in actual effect disclosed to every user. Furthermore, since the personal information which is disclosed to the service provider is saved on a server as a database, in some form there is a danger that the information can be leaked externally. In order for the user to have someone make a search it is unavoidable that they disclose personal information which they desire to be hidden either to the service provider or service user resulting essentially in a contradiction.

Secondly, there is no method for a user to prevent being searched by another user whom they do not wish to be searched by. For example, in the case where a user's name has been registered as personal information for a search in an IP telephone register anyone who knows their name can make a call to this person. Also, in the same way, if a name is registered on a social Networking service ("SNS service") information such as personal relations, activities and personal preferences may become known to a user place of work. By sending numerous automatic requests to this search a third party with malicious intent may create a database of names, other incidental information or even network ID's and use this for malicious purposes. Such actions were entirely legal and could not be stopped by either legal or technical means.

As a result of these problems, within currently realized services which provide actual exchange of data and communication between individuals, most users wishing to have their real names removed from personal information are optionally using "nicknames" which cannot identify a person as personal information which is the object of a search. Therefore, within such services communication is being conducted between mostly anonymous users.

However, for most services such as IP telecommunication and SNS communication using actual names is its very essence. According to the methods proposed until recently, for example, by obtaining the nickname from a user who wishes to communicate directly and searching for the nickname on an IP telecommunication or SNS service communication through electronic mail and conversation as a communication method using real names, communication can be established. Searching using real names which has been necessary in these kinds of services actually does not function anymore.

FIG. 1 shows the traditional search method. The user of this network service, including user A and user B registers their private information of name, E-mail address and the telephone number etc which the individual can specify beforehand with the network service provider. The network service provider's database 11 records this personal information along with the correspondence relationship with each user's unique identification tag (network service ID) which is used to conduct communication and connect with other users on the network service. When A searches for and wishes to communicate with B on this network service, A sends the personal information of B which is known to A such as name, nickname and electronic mail address and performs a search request for B based on this information to the network service provider's server 17 via A's information terminal. When a match is detected between B's personal information which A has sent and B's personal information stored on database 11 of the network service providers server 17 a notification of the match is sent to A's information terminal 18 (14) and communication is established between A's information terminal 18 and B's information terminal 19 via the network service provider's server 17. Alternatively, the network service provider notifies B of A's information terminal network service ID via B's information terminal and at the same time notifies A of B's information terminal network service ID via A's information terminal and A and B's information terminals 18 and 19 are directly connected and peer to peer (P2P) connection is established.

There are two problems associated with this traditional method.

Firstly, there is a problem relating to the security of personal information. The personal information which the user of this type of service registers in advance can, in principle, become the search object of an inquiry made by any user of the service. When a match is detected between the information inquired and the information held on the database a notification of the match is sent to the inquirer. Therefore, A third person C who is a user of the same network service and has no relationship with either A or B can obtain A or B's registered personal information by an inquiry for a name or an electronic mail address. Furthermore, it is possible to construct, for example, a list of users of this service if this search object is scanned with something such as routine software. The user registers with this type of network service and the personal information used in a search is in effect revealed to every user of the network service. Further, since the personal information which is disclosed to the service provider is saved on a server as a database, in some form there is a danger that the information can be leaked externally. In order for the user to have someone make a search it is unavoidable that they disclose personal information which they desire to be hidden either to the service provider or service user. Thus there is an essential contradiction in traditional network services which is that almost all users wish to have their personal information kept hidden.

Secondly, there is a problem that there is no method for a user to prevent their personal information from being searched by another user by whom they do not wish it to be searched. For example, when a users name is registered in an IP telephone directory as personal information for searching purposes and as a result of search for B made be an unrelated third person C, C can request communication from B even if B does not wish to communicate with C. Also, in the same way, If B registers their name with an SNS service it is possible that information such as personal relationships, activities or personal preferences which they do not wish to be known by their place of employment, be revealed. By sending numerous automatic requests to this search a third party with malicious intent may create a database of names, other incidental information or even network service ID's and use this for malicious purposes. Within traditional network services, these are entirely legal and could not be stopped by either legal or technical means.

BRIEF SUMMARY OF THE INVENTION

According to one aspect of the present invention. a system comprises an information terminal of a user A, said information terminal of said user A memorizing information Pa of said user A and information Pb' of a user B;
    an information terminal of said user B, said information terminal of said user B memorizing information Pa' of said user A and information Pb of said user B; and
    a server;
    wherein said information terminal of said user B generates a first calculation result F(Pa', Pb) by a calculation of said information Pa' and said information Pb and said information terminal of said user B sends said first calculation result F(Pa', Pb) to said server,
    wherein said server correlates an identification tag of said user B with said first calculation result F(Pa', Pb) and memorizes said identification tag of said user B and said first calculation result F(Pa', Pb),
    wherein said information terminal of said user A generates a second calculation result F(Pa, Pb') by said calculation of said information Pa and said information Pb' and said information terminal of said user A sends said second calculation result F(Pa, Pb') to said server, and
    wherein said server searches for a calculation result which matches said second calculation result F(Pa, Pb') and detects said identification tag of said user B by detecting a match between said first calculation result F(Pa', Pb) and said second calculation result F(Pa, Pb'), and sends said identification tag of said user B to said information terminal of said user A.

According to one aspect of the present invention. a server comprises a data processor, said data processor receiving a first calculation result F(Pa', Pb) which is calculated by a calculation of information Pa' of a user A and information Pb of a user B, said first calculation result F(Pa', Pb) being generated in the information terminal of said user B, and correlating an identification tag of said user B with said first calculation result F(Pa', Pb) and memorizing said identification tag of said user B and said first calculation result F(Pa', Pb).

According to one aspect of the present invention. an information terminal comprises
    a calculation means which generates a first calculation result F(Pa, Pb') calculated by a calculation of information Pa of a user A and information Pb' of a user B;
    a sending means which sends said first calculation result F(Pa, Pb') to a server, and;
    a receiving means, wherein said server correlates a second calculation result F(Pa', Pb) calculated by said calculation of said information Pa' of said user A and said information Pb of said user B with said identification tag of said user B, and memorizes said second calculation result F(Pa', Pb) and said identification tag of said user B, and searches for a calculation result which matches said first calculation result F(Pa, Pb') which is sent from said information terminal of said user A, said receiving means receiving said identification tag of said user B by detecting a match between said first calculation result F(Pa, Pb') and said second calculation result F(Pa', Pb).

According to one aspect of the present invention, a system comprises an information terminal of a user A, said information terminal of said user A memorizing information P1a, P2a, . . . ,Pna (n is an integer) of said user A and information P1b', P2b', . . . ,Pmb' (m is an integer) of a user B;
an information terminal of said user B, said information terminal of said user B memorizing information P1a', P2a', . . . , Pna' of said user A and information P1b, P2b, . . . , Pmb of said user B; and
a server;
wherein said information terminal of said user B generates one or more first calculation results by an calculation of optionally combined said information P1a', P2a', . . . , Pna' of said user A and said information P1b, P2b, . . . , Pmb of said user B and said information terminal of said user B sends said first calculation result to said server,
wherein said server correlates an identification tag of said user B with said first calculation result and memorizes said identification tag of said user B and said first calculation result,
wherein said information terminal of said user A generates one or more second calculation results by a calculation of optionally combined said information P1a', P2a', . . . , Pna' of said user A and said information P1b, P2b, . . . , Pmb of said user B and said information terminal of said user B sends said second calculation result to said server,
wherein said server searches for a calculation result which matches said second calculation result and detects said identification tag of said user B by detecting at least one match between said first calculation result and said second calculation result, and sends said identification tag of said user B to said information terminal of said user A.

According to one aspect of the present invention, a server comprises a data processor, said data processor receiving one or more calculation results calculated by an calculation of optionally combined information P1a', P2a', . . . , Pna' (n is an integer) of a user A and information P1b, P2b, . . . , Pmb (m is an integer) of a user B, said result being generated in an information terminal of said user B, and correlating an identification tag of said user B with said calculation result and memorizing said identification tag of said user B with said calculation result.

According to one aspect of the present invention. an information terminal comprises
a calculation means which generates one or more first calculation results calculated by a calculation of optionally combined information P1a, P2a, . . . , Pna (n is an integer) of a user A and information P1b', P2b', . . . , Pmb' (m is an integer) of a user B;
a sending means which sends said first calculation result to a server, and;
a receiving means, wherein said server correlates one or more second calculation results calculated by said calculation of said information P1a', P2a', . . . Pna' (n is an integer) of said user A and said information P1b, P2b, . . . , Pmb (m is an integer) of said user B with said identification tag of said user B, and memorizes said second calculation result and said identification tag of said user B, and searches for a calculation result which matches said first calculation result which is sent from said information terminal of said user A, said receiving means receiving said identification tag of said user B by detecting at least one match between said first calculation result and said second calculation result.

According to one aspect of the present invention. a system comprises an information terminal of a user A which memorizes information Pa of said user A and information Pb' and Qb' of a user B;
an information terminal of a user B which memorizes information Pa' of said user A and information Pb and Qb of said user B;
an information terminal of a user C which memorizes information Pa' of said user A and information Pc and Qc of said user C;
a server,
wherein said information terminal of said user B generates a first calculation result F(Pa', Pb) by calculation of said information Pa' and said information Pb and said information terminal of said user B sends said first calculation result F(Pa', Pb) to said server,
wherein said server correlates an identification tag of said user B with said first calculation result F(Pa', Pb) and memorizes said identification tag of said user B and said first calculation result F(Pa', Pb),
wherein said information terminal of said user C generates a second calculation result F(Pa', Pc) by a first calculation result of said information Pa' of said user A and said information Pc of said user C and said information terminal of said user C sends said second calculation result F(Pa', Pc) to said server,
wherein said server correlates an identification tag of said user C with said second calculation result F(Pa', Pc) and memorizes said identification tag of said user C and said second calculation result F(Pa', Pc),
wherein said information terminal of said user A generates a third calculation result F(Pa, Pb') by said a first calculation result of said information Pb' of said user B and said information Pa of said user A and said information terminal of said user A sends said third calculation result F(Pa, Pb') to said server,
wherein said server searches for a calculation result which matches said third calculation result F(Pa, Pb'),
wherein if said first calculation result F(Pa', Pb) matches said second calculation result F(Pa', Pc) and said second calculation result F(Pa', Pc) matches said third calculation result F(Pa, Pb'), said server detects said identification tag of said user B and said identification tag of said user C and sends said identification tag of said user B and said identification tag of said user C to said information terminal of said user A,
wherein said information terminal of said user A generates a fourth calculation result F(Qb') by said second calculation of said information Qb' of said user B, and said information terminal of said user A requests a fifth calculation result F(Qb) calculated by said second calculation of said information Qb of said user B, and requests a sixth calculation result F(Qc) calculated by said second calculation of said information Qc of said user C,
wherein said information terminal of said user B generates said fifth calculation result F(Qb) by said second calculation of said information Qb of said user B, and said information terminal of said user A sends said fifth calculation result F(Qb) to said server, and;
wherein said information terminal of said user A specifies said information terminal of said user B by detecting a match between said fourth calculation result F(Qb') and said fifth calculation result F(Qb).

According to one aspect of the present invention. a system comprises an information terminal of a user A which memorizes information P1a, P2a, . . . , Pna (n is an integer) of said user A, and information P1b', P2b', . . . , Pmb' (m is an integer) of a user B;
  said information terminal of said user B which memorizes information P1a', P2a' . . . , Pna' of said user A, and information P1b, P2b, . . . , Pmb of said user B and flag information FLG1b, FLG2b, . . . , FLGmb which is correlated with each of said information P1b, P2b, . . . , Pmb, of said user B respectively;
  a server;
  said information terminal of said user B generates one or more first calculation results calculated by a first calculation of optionally combined said information P1a', P2a', . . . , Pna' of said user A and said information P1b, P2b, . . . , Pmb of said user B,
  said flag information which is correlated with said information of said user B used in each of said first calculation results, and a pair of said flag information which corresponds to said first calculation result and said first calculation result, is sent to said server,
  said server correlates one pair, said pair being said flag information which corresponds to one or more of said first calculation results and one or more of said first calculation results, with an identification tag of said user B,
  said information terminal of said user A generates one or more second calculation results calculated by said calculation of optionally combined said information P1a', P2a', . . . , Pna' of said user A and said information P1b, P2b, . . . , Pmb of said user B, and said information terminal of said user A sends said second calculation result to said server,
  said server searches for a calculation result which matches said second calculation result, and detects said identification tag of said user B and said flag information of said user B and sends said identification tag and said flag information to said information terminal of said user A.

According to one aspect of the present invention. an information terminal comprises
  a calculation means which generates one or more calculation results by calculation of optionally combined information P1a, P2a, . . . , Pna (n is an integer) of a user A and information P1b', P2b', . . . , Pmb' (m is an integer) of a user B, and said flag information which is correlated with said information of said user B used in each of said first calculation results is correlated by said calculation means with each of said first calculation results respectively;
  a sending means which sends a pair to a server, said pair being said first calculation result and flag information which corresponds to said first calculation result; and
  a receiving means wherein said server correlates one or more second calculation results calculated by said calculation of optionally combined information P1a, P2a, . . . , Pna of said user A and information P1b', P2b', . . . , Pmb' of said user B with said identification tag of said user B, and memorizes said second calculation result and said identification tag of said user B, and searches for a calculation result which matches said first calculation result which is sent from said information terminal of said user A, and said receiving means receives said identification tag of said user B and said flag information of said user B by detecting at least one match between said first calculation result and said second calculation result.

According to one aspect of the present invention. a server comprises a data processor, said data processor receiving a first calculation result which corresponds to flag information which is correlated with information of a user B, said information of user B being used in each of one or more of said first calculation results calculated by calculation of optionally combined information P1a', P2a', . . . Pna' of a user A and information P1b, P2b, . . . , Pmb of said user B, said first calculation result being generated in an information terminal of said user A, and correlating said first calculation results with said identification tag of said user B, and memorizing said first calculation results with said identification tag of said user B.

Another embodiment of the invention relates to a method which comprises generating a first calculation result F(Pa, Pb') calculated by a calculation of information Pa of a user A and information Pb' of a user B; sending said first calculation result F(Pa, Pb') to a server; and at the server, correlating a second calculation result F(Pa', Pb) calculated by the calculation of the information Pa' of user A and the information Pb of user B with the identification tag of user B, memorizing the second calculation result F(Pa', Pb) and the identification tag of user B, and searching for a calculation result which matches the first calculation result F(Pa, Pb') which is sent from the information terminal of said A; and receiving the identification tag of user B by detecting a match between the first calculation result F(Pa, Pb') and the second calculation result F(Pa', Pb). In this method, the first calculation result is a calculated result F(*, Pb') of the same wild card information * memorized in both the information terminal of user A and the information terminal of user B and the information Pb, and second calculation result is a calculation result F(*, Pb) of the wild card information * and information Pb'.

DETAILED DESCRIPTION OF THE INVENTION

Below, while referring to the figures details will be explained about the embodiments of the present invention. The present invention is not only limited to the examples of the system, methods, computer programs, servers, information terminals, operating systems, middleware, information communication devices, verification methods, system and application software of the embodiments described below.

(Embodiment 1)

While referring to FIGS. 2 to 7, the principle of searching with relation to the systems, methods, computer programs, servers, information terminals, operating systems, middle ware, information communication devices, verification methods, system and application software in the present embodiment will be explained. FIGS. 2 to 7 shows a method to search for user B who uses the same network service as A and who knows Network service user A, who communicates or performs data exchange between specified individuals using an information terminal connected to a network, such as electronic mail, IP telecommunication, network game, SNS etc uses the search function which is provided by the systems, methods, computer programs, servers, information terminals, operating systems, middle ware, information communication devices, verification methods, system and application software related to one embodiment of the present invention.

Figure 2:
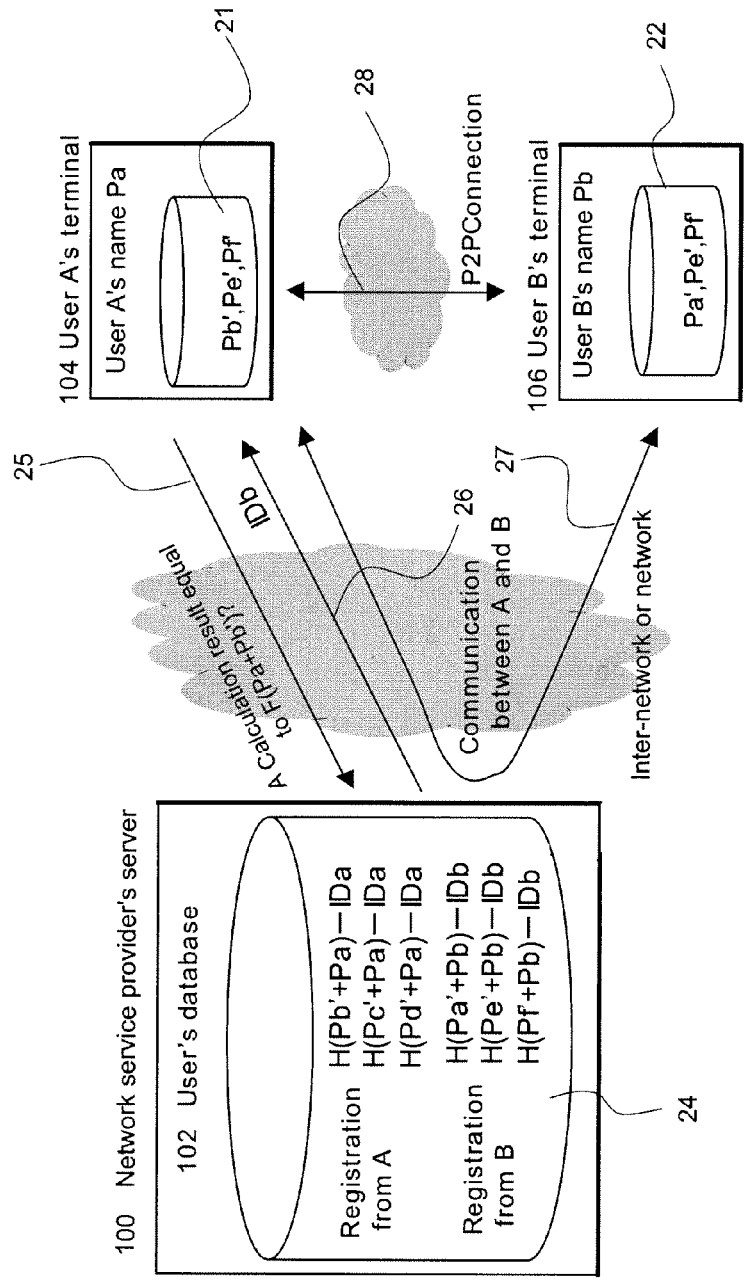
FIG. 2 shows a system according to one embodiment of the present invention.

FIG. 2 shows one example of the present embodiment. Here, the system and methods related to one embodiment of the present invention will be explained below. The systems, methods, computer programs, and information communication devices of the present invention are mounted with operating systems, middle ware, verification methods and application software of the present invention and the methods of the present invention are executed.

The system of the present invention related to this embodiment has a server 100, an information terminal 104 and an information terminal 106. In FIG. 2, an information terminal or user terminal 104 or 106, which are information communication devices of one embodiment, are connected via a direct connection by server 100 and the internet, an intranet, LAN or USB etc, is shown. Within the user information terminal 104 and 106, operating systems, middle ware, verification methods and application software are mounted and the methods of the present invention are executed.

Within FIG. 2, User A and User B use information terminal 104 and 106 respectively and which are connected to a network and perform communication or data exchange between specified individuals. User A and User B are for example, users of a specified network service, electronic mail, IP telecommunication, network game or SNS etc.

Here, in FIG. 2, in the address book which is memorized in the information terminal 104 of A, the personal information of three of A's friends B, C, D are registered as names Pb', Pc', Pd' (21). The situation shown in FIG. 2 shows that it is acceptable for A to communicate with B, C or D. Also, in the address book which is memorized in B's information terminal 106, the names of three friends A, E, F which B directly knows are registered Pa', Pe', Pf' (22).

The dash (') to the upper right of each piece of information (names in this embodiment) represents the information which another user stores and which is memorized in each terminal of each user. For example, in FIG. 2, Pb' refers to the name of B which A holds and is memorized and stored in A's terminal. Also, Pb refers to B's own name which B holds and is memorized and stored in B's own terminal. In usual circumstances, Pb'=Pb, however, if the information memorized and stored in whichever terminal is wrong or old, for example, then this is not always the case.

Figure 3:
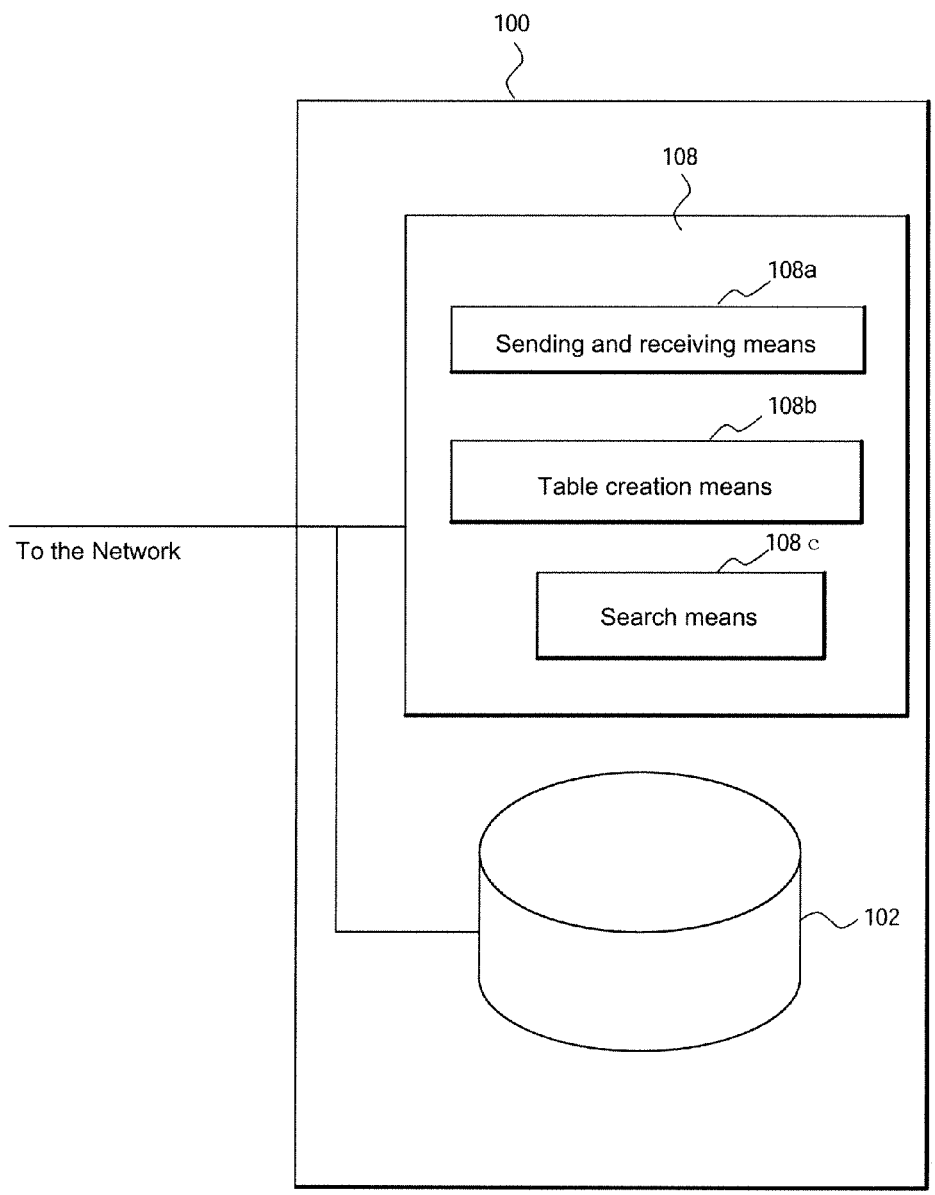
FIG. 3 shows the construction of a server according to one embodiment of the present invention.

FIG. 3 is an outline block diagram of server 100 of the present embodiment. Server 100 has a database 102 in which information such as the names of users who use the present invention's system of the present embodiment is memorized and stored, and a data process means (a data processor) 108. The data process means 108 has a sending and receiving means 108a, a table construction means 108b and a search means 108c.

Figure 4:
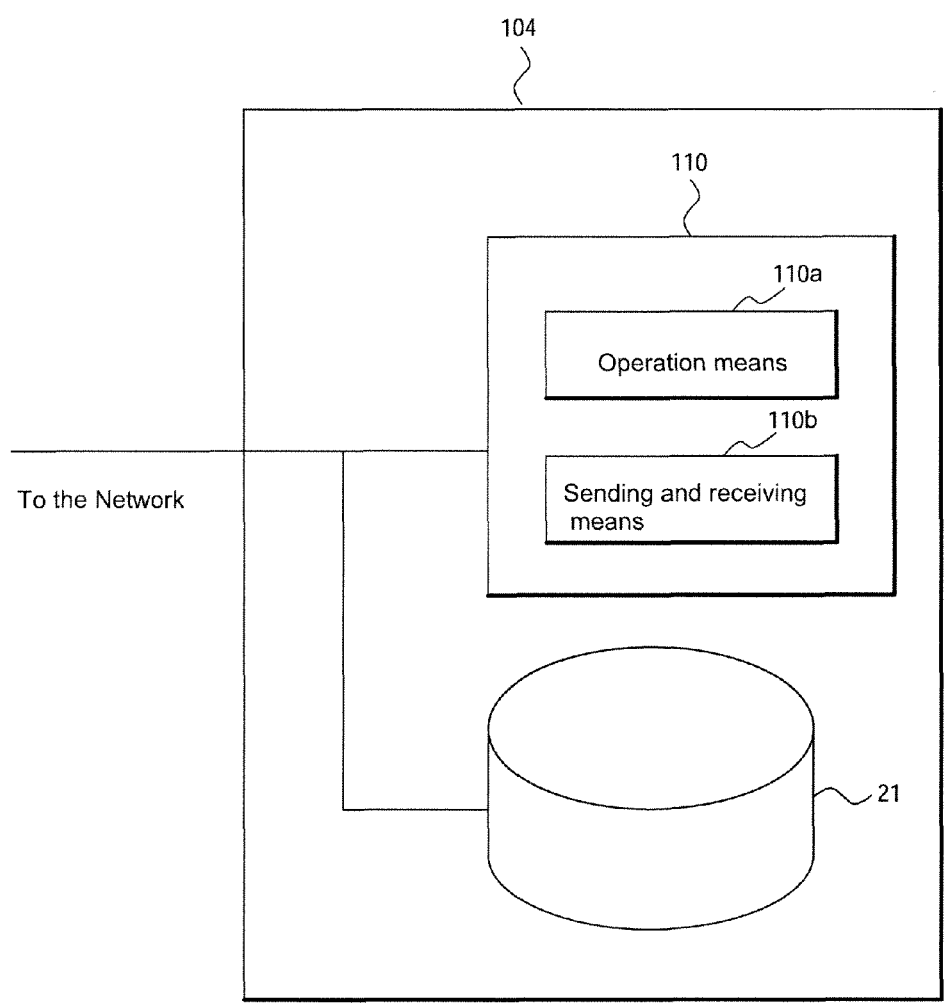
FIG. 4 shows the construction of information terminal A according to one embodiment of the present invention.

FIG. 4 is a block diagram of user A's information terminal 104 of the present embodiment. The information terminal 104 has a database 21 in which information such as the names of other users who use the present invention's system of the present embodiment is memorized and stored and a data process means (data processor) 110. The data process means 110 has an operation means 110a and a sending and receiving means 110b.

Figure 5:
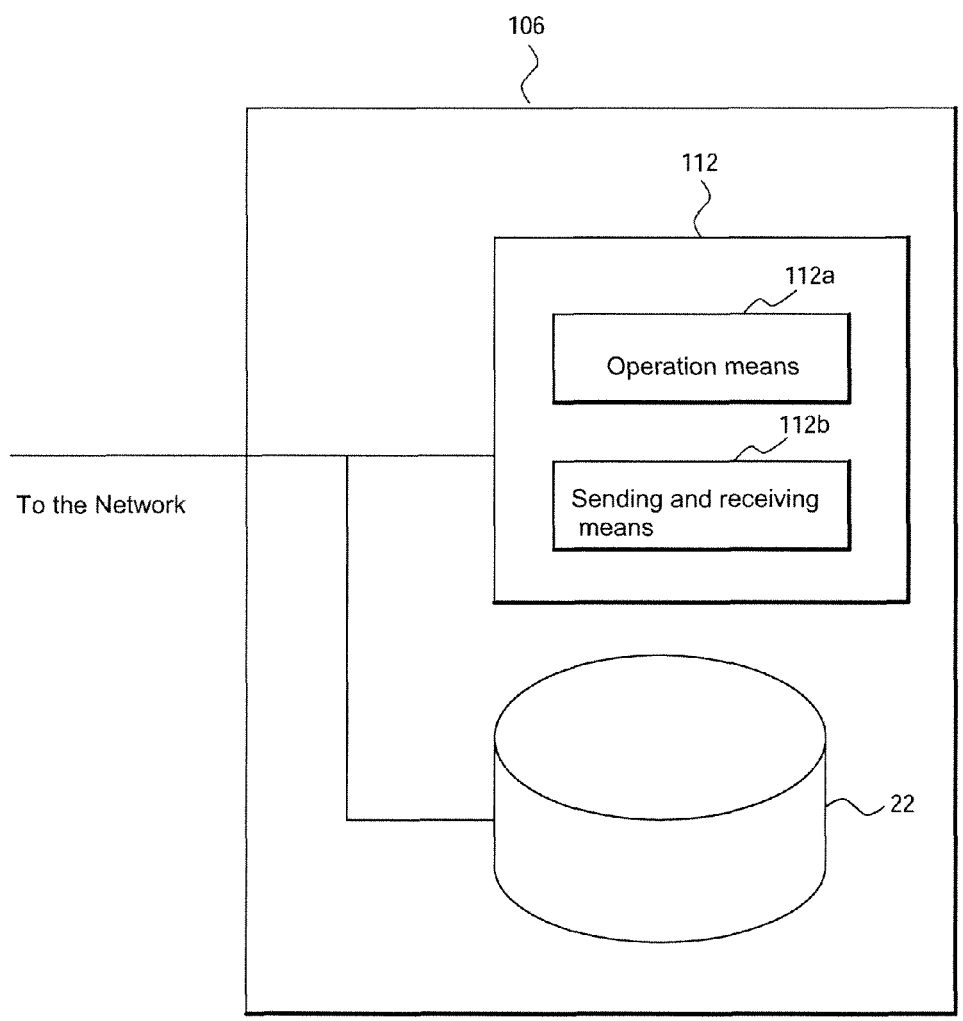
FIG. 5 shows the construction of information terminal B according to one embodiment of the present invention.

FIG. 5 is a block diagram of user B's information terminal 106 of the present embodiment. Similar to the information terminal 104, the information terminal 106 has a database 22 in which information such as the names of other users who use the present invention's system of the present embodiment is memorized and stored and a data process means (data processor) 112. The data process means 112 has an operation means 112a and a sending and receiving means 112b.

Figure 6:
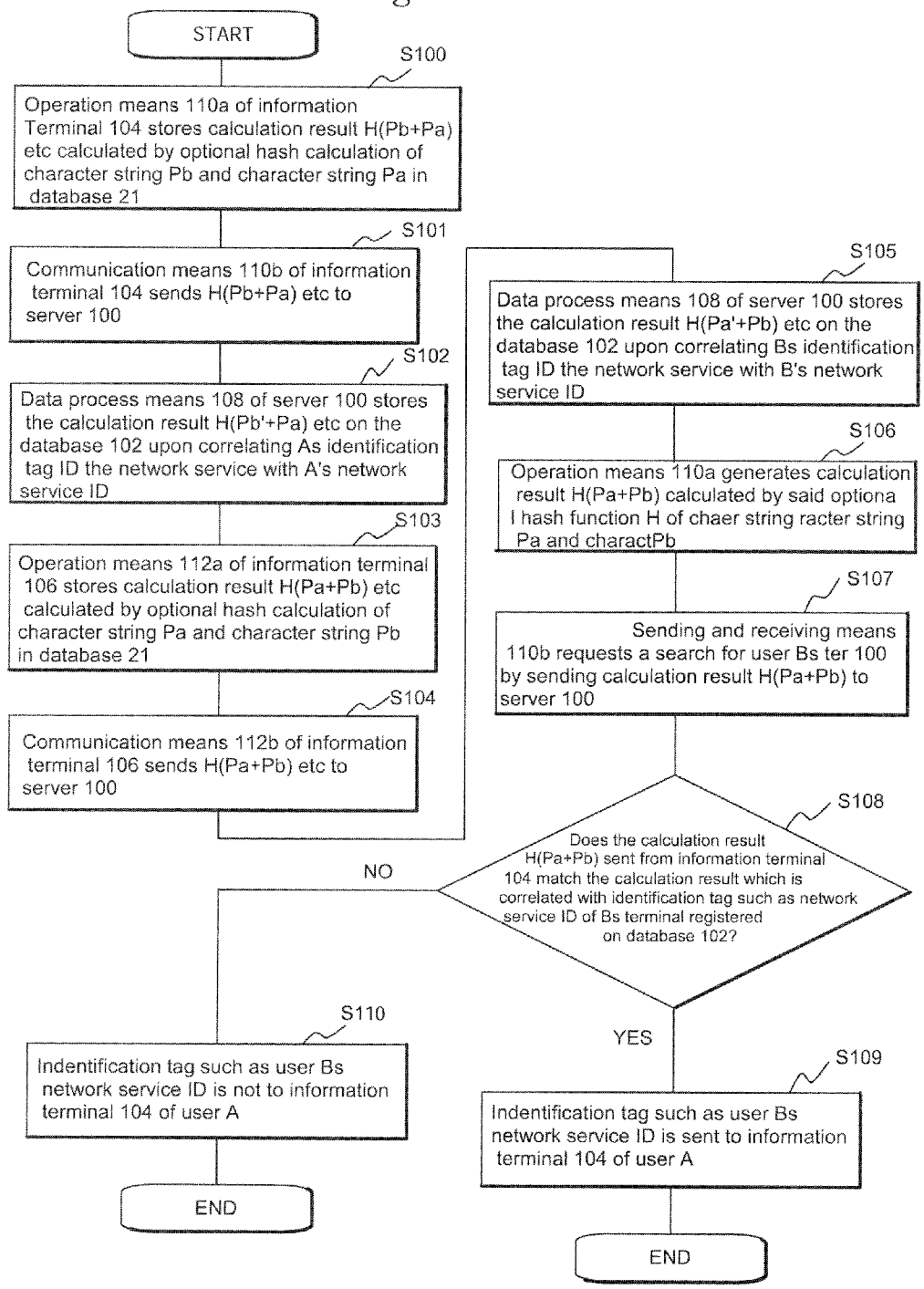
FIG. 6 is a flowchart which shows the methods according to one embodiment of the present invention.

Below, in the case where user A memorizes and stores the information of the other users B, C and D in the database 21 of information terminal 104 and user B memorizes and stores the information of the other users A, E and F in the database 22 of information terminal 106, after information terminal 104 searches for information terminal 106, the step which establishes communication will be explained while referring to FIGS. 2 to 7. FIG. 6 is flowchart which shows the operation of establishing communication after information terminal 104 searches for information terminal 106 by the method or system of the present invention in this embodiment. Further, the information of other users may be memorized and stored in the information terminals 104 or 106.

In the information terminal 104 of user A in FIG. 2, the operation means 110a generates a connection Pb'+Pa between the character string Pb' which represents the name of user B which is memorized and stored in the database 21 and the character string Pa which represents user A's own name and which is memorized and stored in the database 21. Further, in combination with this connection character string, the result H (Pb'+Pa), which performed the calculation via an optional hash function such as SHA-1 or MD-5, is memorized and stored in the database 21 (step S100). Here, the calculation result which processed the connection character strings via a hash function H is represented as H (Pb'+Pa). Similarly, in the information terminal 104 of user A, after the connection of character strings which represent each of the names C and A, D and A, the operation means 110 forms the calculation result H(Pc'+Pa), H(Pd'+Pa) which is calculated by the hash function and is memorized and stored in the database 21 (step S100). Next, the sending and receiving means 110b of the information terminal 104 of user A sends the calculation result H(Pb'+Pa), H(Pc'+Pa) or H(Pd'+Pa) to the server 100 of the network service provider (step S101). The data process means 108 of the server 100 receives H(Pb'+Pa), H(Pc'+Pa) and H(Pd'+Pa) by the sending and receiving means 108a. The table construction means 108b of server 100 upon correlating the necessary information for a connection with A or the identification tag IDa to uniquely specify user A on the network service which has A's network service ID, memorizes and stores the calculation result H(Pb'+Pa), H(Pc'+Pa), or H(Pd'+Pa) on the database 102 (step S102). Here, an identification tag is any information which user A can use to uniquely specify upon this network service, for example, a numerical value which the network service provider allots in advance so that there is no duplication between all the users including user A or information such as a mail address which understands in advance that that is no duplication with other users of this network service. The identification tags in the present embodiment and all of the following embodiments are the same above. Further, the sending and receiving data and calculation in server 100 and the information terminal 104 of user A can be processed in the application, middleware or computer program which operates in the operating system which is included in data process means 108 and 110.

Here, in this embodiment 1, the calculation result, which is generated by the hash function of the character string connection of other users names and ones own name and memorized in the terminal 104 of user A, is used. However, the personal information used in this invention is not limited to names but could also be addresses, age, telephone numbers, electronic mail addresses, occupation, place of work, schools attended and birthplaces. In addition also, as personal information the same category is used, Pa is the name of user A memorized on user A's terminal 104 and Pb', Pc' and Pd' are the names of B, C and D respectively. However, different categories of information may be used in combination such as A's name for Pa, B's address for Pb', C's telephone umber for Pc' and D's age for Pd'. Further, it does not have to be information which can specify an individual generally called personal information but may also be password formed from general information decided in advance by the communicating users.

Also, in the present embodiment, for example, the calculation result H (Pb'+Pa) generated by the hash function performed after the operation of the connection of the character strings Pb' and Pa, is used. However, the calculation result may be an optional calculation result F(Pb',Pa) decided uniquely by a result based on Pb' and Pa. This optional calculation F(Pb',Pa) may be a reversible calculation, that is, can calculate Pb' and Pa backwards from F(Pb',Pa) or an irreversible calculation, that is, unable to calculate Pb' and Pa backwards from F(Pb',Pa). Also, this optional calculation F(Pb', Pa) may also be a commutative calculation, that is F(Pb',Pa) =F(Pa,Pb') or a non-commutative calculation, that is (Pb',Pa) ≠F(Pa,Pb'). The character string connection hash function calculation H(Pb'+Pa) used in the present embodiment is simply one example using a non commutative and irreversible calculation within the optional calculation F(Pb',Pa). Also, the character string connection hash function calculation result used in the present and all following embodiments, may also be optional functional calculation results as described here.

Similarly, in the information terminal 106 of user B in FIG. 2, the calculation means 112a forms a connection Pa'+Pb between the character string Pa' which represents the name of user A which is memorized and stored in database 22, and the character string Pb which represents user Bs own name and which is memorized and stored in database 22. Further, in combination with this connection character string, the result H (Pa'+Pb), which performs the calculation via an optional hash function such as SHA-1,MD-5, is formed and memorized and stored in database 22 (step S103). This hash calculation H of the character string combination which takes place in user B's information terminal 106 may be any hash calculation, however, the same calculation H as the hash calculation H which takes place in A's information terminal 104 is requested. Similarly, in the information terminal 106 of user B the calculation means 112a forms the hash calculation H (Pe'+Pb), and H (Pf'+Pb) of the character string combination of each of the names of E and B, F and B and memorizes and stores these three calculation results H (Pa'+Pb), H (Pe'+Pb), and H (Pf'+Pb) in database 22 (step S103). Next, the sending and reception means 112b of B's information terminal 106 sends the calculation results H (Pa'+Pb), H (Pe'+Pb), and H (Pf'+Pb) to the server 100 of the network service provider (S104). The data process means 108 of server 100 receives the calculation results H (Pa'+Pb), H (Pe'+Pb), and H (Pf'+Pb) via the sending and reception means 108b. The table construction means of server 100 correlates and registers (24) the calculation results H (Pa'+Pb), H (Pe'+Pb), and H (Pf'+Pb) with B's network service ID or the identification tag IDb to uniquely specify B on this network service or the information required for a connection with B and memorizes and stores this in database 102 (step S105). Further, the hash value formation in B's information terminal 106 can be processed in the application, middleware or computer program which operates in the operating system which is included in the data process means.

Here, in embodiment 1, the calculation result, which is formed by the hash function of the character string connection of other user's names and ones own name and memorized in the terminal 106 of user B, is used. However, the personal information used here is not limited to names but may also be addresses, age, telephone numbers, electronic mail addresses, occupation, place of work, schools attended and birthplaces and so on. Here also, as personal information the same category is used, Pb is the name of user B memorized on user B's terminal 106 and Pa', Pe' and Pf' are the names of A, E and F. However, different categories of information can be used in combination such as a B's name for Pb, A's address for Pa', E's telephone number for Pe' and F's occupation for Pf'. Further, the information does not have to be information which can specify an individual generally called personal information but may also be password generated from general information decided in advance by the communicating users.

Next, when user A wishes to communicate with user B, calculation means 110a forms a hash calculation result H (Pa+Pb') of the character string connection of B's name and A's name within user A's information terminal 104 (step S106). The optional hash calculation H performed in A's information terminal 104 may be any calculation, however, user A's information terminal 104 requests that the hash calculation H be the same as the hash calculation required for registering in server 100. And the sending and reception means 110b of user A's information terminal 104 requests a search (25) to server 100 by sending the calculation result H (Pa+Pb') to the server 100 of the network service provider (step S107). The calculation result H (Pa+Pb') sent from information terminal 104 is received via the sending and reception means 108a of the data processing means 108 in server 100. And, the search means 108c of the data process means 108 searches for a calculation result memorized in database 100 which matches the calculation result H (Pa+Pb') sent from information terminal 104. Here, as shown in the example in FIG. 2, B's identification tag or H (Pa'+Pb) which has been correlated with the information required to connect with B, is registered via B in the network service provider's database 102. With this search request, the search means 108c in network service provider server 100 in database 100 detects a match between the calculation result H (Pa+Pb') sent from information terminal 104 and B's identification tag registered in database 100 or the registered calculation result correlated with the information required for a connection (in other words, H (Pa+Pb')=H(Pa'+Pb)) (26). Based on this, server 100 sends B's identification tag IDb upon this network service or connection information, to the information terminal of user A. User A's information terminal 104 establishes communication (27) with user B's information terminal via connection server 200 based on user B's network service identification tag IDb sent from the server or the required information for a connection with B. Also, with user A's search request, if the search means 108c in the server 100 of the network service provider does not detect a match within the database 100 between the calculation result H (Pa+Pb') sent from information terminal 104 and a) B's network identification tag registered in database 100 or b) the registered calculation result correlated with the information required for a connection with B, then server 100 does not send user B's network service identification tag or the required information for a connection with B to user A's information terminal 104 and communication (27) between user A's information terminal 104 and user B's information terminal 106 is not established (step S110).

In the present embodiment, in FIG. 2, in the case where the communication and data transmission via this network service, is formed over a P2P network, the inquiry which is made regarding H (Pa+Pb') from A's information terminal 104 to server 100, when a match is detected in server 100 between the inquiry and H (Pa'+Pb) registered in server 100 via B (H(Pa+Pb')=H(Pa'+Pb)) the service provider's server 100 notifies A's information terminal 104 of B's network service identification tag or the required information for a connection with B and a P2P connection (28) between A's information terminal 104 and B's information terminal 106 may be established.

Further, in this embodiment, A's information terminal 104 used a hash calculation result combination of the same category of information in its information H (Pa+Pb') request to server 100, namely A's own name and B's name, however, for example, it is possible to combine personal information from different categories such as A's telephone number as Pa and B's address as Pb' and use this hash value in an inquiry to server 100. Further, this information does not have to be information which can specify an individual generally called personal information but may also be a password formed from general information decided in advance by the communicating users. Even in this case, if the hash value of the combination of personal information used in an inquiry made to server 100 from A's terminal 104 is equal to the hash value of the combination of personal information registered (step S104) in server 100 by B's information terminal 106, (H (Pa+Pb')=H (Pa'+Pb)), then server 100 sends B's identification tag to A's information terminal 104. In this case, if H (Pa+Pb')≠H (Pa'+Pb) then server 100 does not send B's identification tag to A's information terminal 104.

In the present embodiment, a non commutative calculation of a names character string connection hash function is used as one example, however, as already stated, this may also be an optional calculation F. Generally, in the case where a non commutative optional calculation is used in the search of user B from user A's information terminal, a) A's own information which is stored in user A's information terminal 104 and B's personal information and b) B's own information which is stored in user B's information terminal 106 and A's personal information are both correct, that is to say when Pa'=Pa and Pb'=Pb, server 100's search means 108c can uniquely specify user B's terminal 106.

If, here, in the case where a commutative optional calculation is used in the search of user B from user A's information terminal a) A's own information which is stored in user A's information terminal 104 and B's personal information and b) B's own information which is stored in user B's information terminal 106 and A's personal information are both correct, that is to say when Pa'=Pa and Pb'=Pb, user B's information terminal 106 sends to the network service providers server 100 and F (Pa',Pb) which is stored in the user database 102 and user A's inquiry F (Pb',Pa) which is made to the network service provider's server 100 become equal. As a result, the inquiry 25 made when user A wishes to communicate with user B, in order to uniquely specify user B, server 100's search means 108 detects a match of F (Pa',Pb) registered by user A and F (Pb',Pa) registered by user B, however, by this result alone A cannot uniquely specify B who wishes to communicate. Therefore, where the optional calculation F used here is commutative, when user A makes an inquiry 25 of user B, by sending a combination of A's network service identification tag and connection information to server 100 a judgment is made as to which of the two calculation results which detect a match within server 100's search means belong to user B who is the object of the search, and user A can uniquely specify user B.

Also, the calculation result H (Pa'+Pb) used in the present embodiment is memorized and stored in advance in the network service provider's server 100. The result may be used again in the connection from A to B, however, if B's network service identification tag IDb or the information which is required to connect with B which are sent once from server 100 to A's terminal are stored in advance in the database 21 in A's terminal 104, when A wishes to communicate with B after the second time, B's identification tag and the required information for connection are used as a base and because a connection can be established with B, H (Pa'+Pb) which is searched once, can be deleted from the network service provider's server database 102.

Figure 7:
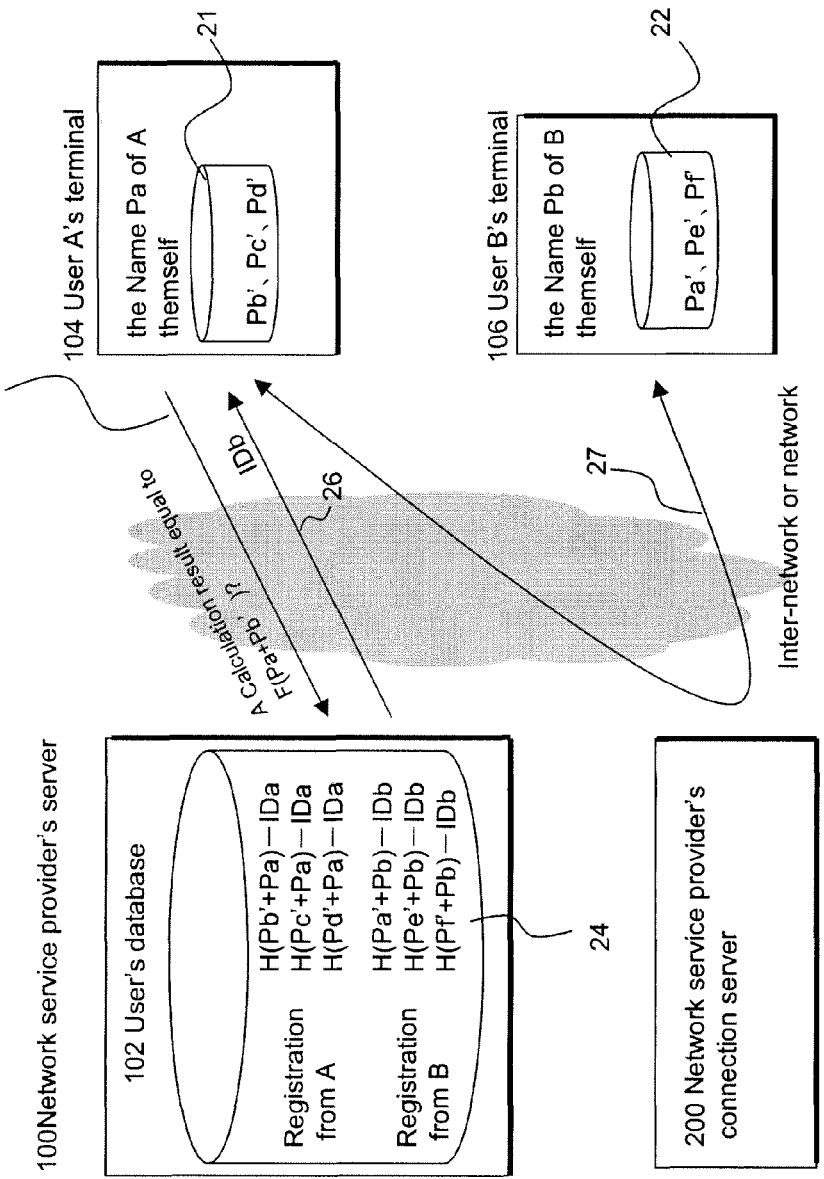
FIG. 7 shows the systems according to one embodiment of the present invention.

If, for example, when information such as A's name which is stored in B's information terminal 106 is incorrect, that is to say Pa'≠Pa. H (Pa+Pb')≠H (Pa'+Pb) occurs, and in the above mentioned procedure even when A searches for B a match of calculation result F can not be detected. In cases such as these, information other than names, for example addresses, affiliations, telephone numbers and electronic mail addresses can be used in a similar search means and A can uniquely specify B in A's search for B. In other words, it is possible to form a calculation result H using a character string connection of other personal information such as residential area, address, affiliations, telephone number, electronic mail address, birth place, preferences/tastes (for example favorite movie, favorite music, favorite singer, favorite car, car maker, favorite foreign country, favorite sport, favorite artist, the make of the computer used, favorite cooking etc) and realize a similar search means Further, as stated above, when communication is established between A's information terminal 104 and B's information terminal 106, by a detection of B's network service identification tag IDb or the information necessary for a connection with B from the service provider's server 100 to A's information terminal 104, a P2P connection 28 can be established between A's information terminal 104 and B's information terminal 106. Also, as shown in FIG. 7, through a different network service provider's connection server 300, connection can be established between A's information terminal 104 and B's information terminal 106.

Figure 1:
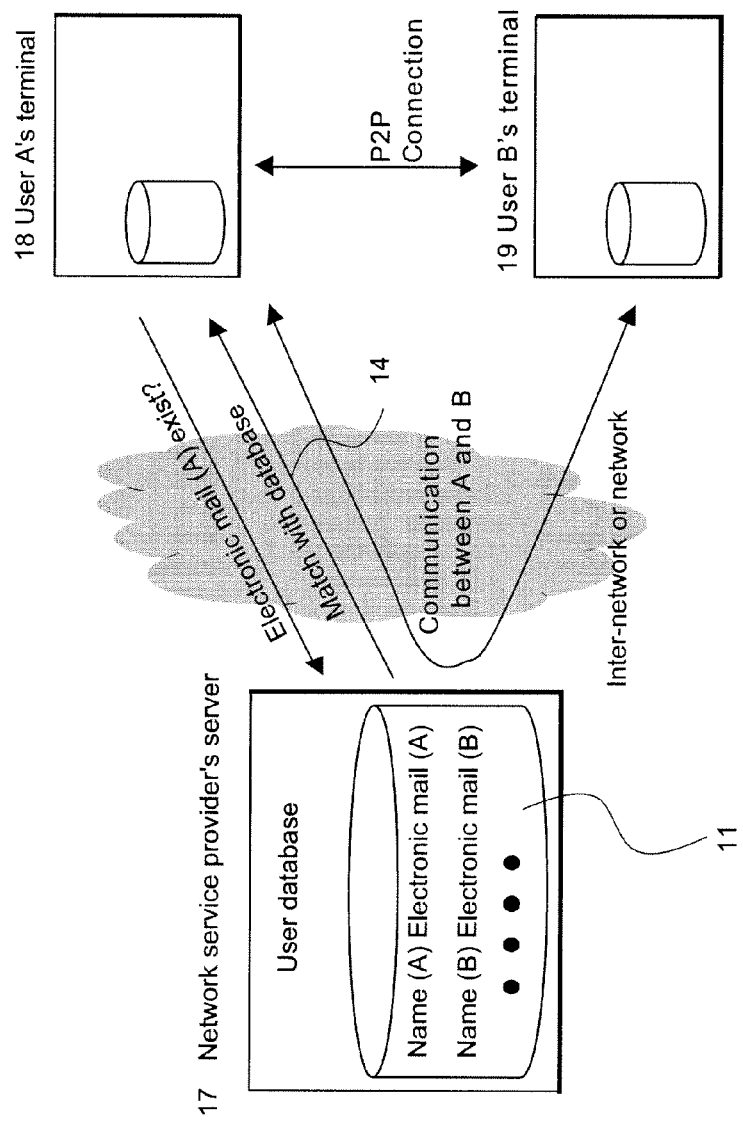
FIG. 1 shows the search methods of communicating partners according to conventional methods.

According to the systems and means of the present invention related to the embodiments stated above there are three advantages when compared to the conventional means shown in FIG. 1.

Firstly, where a non commutative calculation result is used such as the hash function calculation of the character string connection used in the present embodiment, it is easier to preserve security in a search service. In the conventional search means, if personal information is not registered in the network service provider's server a user could not perform a search. However, according to the system and means of the present invention, in the case where a non commutative calculation is used, because the calculation result which is processed via the non commutative calculation of the personal information of two users, it is possible for the searcher to perform a search despite the user being searched not revealing any personal information for the search and a search means can be offered without the need for any personal information to be stored by the network service provider. For example, in the example in FIG. 2, it is not B's own personal information which is displayed to the network service provider as information needed for B to have another user search for him/her, however, for example, the calculation result H (Pa'+Pb) via the hash function of the character string connection of A and B's names and it cannot lead to A or B's personal information from this hash value. Consequently, according to the system and means of the present invention, it is possible to sufficiently assure the protection of personal information. If, according to the system and means of the present invention, a commutative calculation is used, it is possible to reconstruct a user's personal information from the information registered in the network service provider's server and the level of security preservation related to user's personal information becomes lower than when a non commutative calculation is used. However, even when a commutative calculation is used, compared to the conventional method, there are two advantages, outlined below, which are similar to when a non commutative calculation is used.

Secondly, as the object of a search it is possible for a user to exclude a search from an undesired searcher. In the conventional means as shown in FIG. 1, since all users can perform a search, a user can be searched by an unrelated third party and there is a danger that the personal information revealed by the searched user in the search could be obtained by an unrelated third party. However, according to the system and means of the present invention, because the user who is the object of a search has registered in advance a combination hash of their own name and another user's name who they know and allow to be searched by a search cannot be conducted by someone other than the user whose name has been combined and registered with one's own name. In other words, there will be no search conducted by someone who the user doesn't wish to be searched by. For example in FIG. 2, only B, C and D can search for A and no other user has a means for searching for A.

Thirdly, even if information with a low level of uniqueness is used it is possible to conduct a search with a high level of accuracy. According to conventional means, when a search is conducted using personal information with a low level of uniqueness such as names where there is high possibility of repetition of surname and forename, there would be a large number of detections of matches of users with the same surname and forename and thus it is impossible to specify the object of a search. As a result, personal information which is unlikely to be repeated such as electronic mail addresses, telephone numbers or social security numbers were often used in a search of personal information, however, information which is understood in advance which is unlikely to be repeated has a higher level of secrecy than names for example and is registered on the server of the network service provider and at the same time there is a risk of information leakage in permitting a search to an unspecified user. According to the system and means of the present invention, even when personal information such as names, which have a low level of uniqueness and which multiple users are likely to share, is used, since it is the hash value of the combination of two users personal information which is registered with the server of the network service provider and used in a search, the possibility of detecting a match of repetitions in a search becomes extremely low. For example, even if there are many users with the same surname and forename as user B, the probability that there are many combinations of A and B within the combinations of users is much smaller than the probability of there being a user with the same surname and forename as B. As a result, names have a low level of uniqueness and therefore with only simple information which has a low level of secrecy and which everyone is aware, an effective search can be possible.

Also, at first, in the system and means of the present invention, as long as a non commutative calculation is used as stated above, even if information with a high level of uniqueness, in other words a high level of secrecy, is used, because it is the combined, non commutative, calculated calculation result which becomes the object of a search, a search cannot lead to personal information from the calculation result which is the search object and thus is safe. For example, by using information which can specify an individual such as email addresses, addresses or telephone numbers, repetition at the time of a search can be removed via the conventional means or the present invention, however, by using the means of the present invention it is possible to guarantee an extremely high level of secrecy retention compared to the conventional means.

Yet, in the case where multiple matches of the calculation result are detected by the repetition of personal information such as the same surname and forename within the search means 108c of server 100, there is also a means which presumes the user as the search object with a high level of accuracy by using a combination calculation result of information other than names such as residing city, gender and affiliations. For example, B registers name P, gender Q and affiliation R in advance as the calculation result H (Pa'+Pb), H (Qa'+Qb), H (Ra'+Rb) via the character string combination hash function of B's own and A's personal information to the database 102 of server 100 and when A searches for B a search request is made to server 100 concerning H (Pa+Pb'), H (Qa+Qb'), H (Ra+Rb'). For example, in the search means 108 of server 100, a match of the calculation result is established concerning all the attributes P, Q, R. That is to say, even when (Pa'+Pb)=H(Pa+Pb') and H (Qa'+Qb)=H (Qa+Qb') and H (Ra'+Rb)=H (Ra+Rb') is not established, A attaches a weight factor ($\alpha$, $\beta$, $\gamma$ etc) in advance to each of the attributes P, Q, R in the database 21 of information terminal 104 and, using these, by calculating the total weight of the number of matches of the calculation result, user A can search on this network service for the partner who is assumed to be B and who wishes to communicate.

Also, a malafide third party who uses the same network service as A and B and who knows the names of A and B, can obtain the information that there is a relationship between A and B by constructing a character string combination hash function calculation result H (Pa'+Pb) of the names of A and B and by the result of making an inquiry of this to the server 100. Alternatively, they may become A and search for B. In such cases, B informs A in advance of a passcode μb by a means such as electronic mail or verbally and B registers H (Pa'+Pb+μb) with the database 102 of the server 100. When A searches for B, A uses pb which has been received from B in advance and by inquiring H (Pa+Pb'+μb) to server 100, it is possible to reduce the danger that a relationship exists between A and B being known by a malicious third party who does not know pb or a third party becoming A and searching for B.

In addition, a hash calculation result which is created in the step S103 by user B who is the object of a search, and which is sent to the server 100 in step S104, and which is correlated and registered with B's identification tag IDb in database 102 in step S105. and which is memorized in both the database 21 of A's information terminal who searches, and the database 22 of B's information terminal, may for example, be a calculation result H (*+Pb) via a hash function of a common wild card character string [*] across this entire network service and a character string which represents the personal information Pb of B themselves which is memorized in the database 22 of B's information terminal 106. In this case, user A who searches, generates a hash calculation result H (*+Pb') of B's personal information Pb' which is memorized in the database 21 of A's information terminal and this wild card character string [*] in step S106 and by sending this to the server 100 in step S107, when a search for user B is requested, detects a match with H (*+Pb) to the search request by H (*+Pb') in step S108. And in the step S109, it is possible to send the identification tag IDb of B, who is the object of a search, and which is correlated with H(*+Pb) and memorized in step S109. In this way, B which is the object of a search, is not restricted to a search from the searcher A shown in this embodiment, and it is possible to send the identification tag IDb of user B in response to a search from the terminal of an optional user in the database of which the information of user B is memorized from all the users of this network service.

(Embodiment 2)

In embodiment 1 described above, the user being searched registers in advance the calculated result of one piece of their own personal information and one piece of personal information of the searcher who they have permitted to make a search with server 100 of the network service provider. In embodiment 2, a more general means will be explained than this. The user being searched registers with server 100 of the network service provider in advance the calculation result of one or more optional combinations within the permutated combination of one piece or more of their own information and one piece or more of information of the searcher who they have permitted to make a search and the searcher makes an inquiry to the server 100 of the calculation result of one or more optional combinations of one piece or more of their own information and one piece or more of information of the user they are searching for. Further, regarding the system and means and similar components of the present invention related to embodiment 1, the same mark will be attached and is not explained again here. Since the flowchart of the operation of the establishment of communication between information terminal 104 and information terminal 106 via the system and means of the present invention related to this embodiment is similar to FIG. 6 of embodiment 1, FIG. 6 will be referred to here.

For example, user A's personal information is made to be P1a,P2a, . . . ,Pna (n is an integer). User B's personal information is made to be P1b,P2b, . . . ,Pmb (m is an integer). Here, like P1a and P1b for example, the personal information may be the same category or of a different category for signs of the same number. Further, the information used here does not need to be so called general personal information to specify an individual but can be general information such as a password which the communicating parties have decided in advance. User A's information terminal 104 stores user A's personal information P1a,P2a, . . . ,Pna and user B's personal information P1b',P2b', . . . ,Pmb' in database 21. User B's information terminal 105 stores user B's personal information P1b,P2b, . . . ,Pmb and user A's personal information P1a',P2a', . . . ,Pna' in database 22. The number and variety of user A and user B's personal information is optional. Also, it may be m=n and men. Also, the number of A's personal information which is stored in user A's information terminal 104 and the number of A's personal information which is stored in user B's information terminal 106 may be the same or different. Similarly, the number of B's personal information which is stored in user B's information terminal 106 and the number of B's personal information which is stored in user A's information terminal 104 may be the same or different.

However, as in embodiment 1, the dash to the upper right of each piece of information represents the information which another user stores and which is memorized in each terminal of each user. For example, if P1a and P1b are names and P2a and P2b are addresses and P3a and P3b are places of work then P1b' refers to B's name which is stored by A on A's terminal 104. Also, for example, P2b refers to B's own address which B stores on B's terminal 106. For example, in usual circumstances, P1b'=P1b and P2b'=P2b, however, if the information stored and memorized in whichever terminal is wrong or old, for example, then this is not always the case.

Here, the step for establishing communication between user A's information terminal 104 and user B's information terminal 106 using several pieces of information will be explained. Further, because this step is similar to the step shown in FIG. 2 and the step shown in FIG. 6 in embodiment 1 above, the explanation will be appropriately abbreviated. Also, in the example shown in embodiment one stated above, a character string combination hash function which is the easiest to understand was used as an example, however, in the example shown in this embodiment, an optional calculation F which attempts to change personal information is used and explained. Therefore, in embodiment 2, the calculation inscription of the character string combination hash function H(Pb'+Pa) for example, which appears in FIG. 2, will be replaced with F(Pb',Pa) which is used in the optional function F, and explained.

As in embodiment 1 above, the optional calculation F used here can be either a reversible or irreversible calculation. As already stated, when a reversible calculation is used here, among the effects of the present invention stated in embodiment 1, security is reduced compared to using an irreversible calculation. However, all other effects of the present invention remain unchanged. Further, the optional calculation F used here can be either commutative or non commutative in terms of the variable number of personal information.

In user A's information terminal 104 the calculation means 110a calculates via the optional calculation F, B's personal information P1b',P2b', . . . ,Pmb' which is memorized and stored in database 21 and A's personal information P1a, P2a, . . . , Pna which is memorized and stored in database 21 (step S100). It is possible to optionally combine permutably user B's personal information and user A's own personal information which is calculated within user A's information terminal 104. In other words, the combination of B's personal information and A's personal information may be (P1b',P1a), (P2b',P1a), (P1b',P2b',P1a,P2a), . . . , (P1b',P2b', . . . ,Pmb', P1a,P2a, . . . ,Pna) or by the calculation means 110a in A's terminal a calculation of one or more optional combinations is carried out from among these.

Usually, B's personal information which is memorized and stored in database 21 in user A's terminal is fewer when compared to A's own information 1a,P2a, . . . ,Pna in A's terminal. For example, A knows a lot of information such as A's own name, address, telephone number, birthplace etc, and this is often memorized and stored in database 21 in A's terminal. However, B's information, such as name and telephone number only, is usually restricted as it is another's personal information. Even in such circumstances, the combination of B's personal information and A's personal information which is combined in user A's terminal can be an optional combination of one or more which can be made from one of those which is memorized in database 21 of A's terminal. Also, there is no need for all of A's and B's personal information which is stored in database 21 in A's terminal to be combined and user A can optionally choose that combination.

Further, where only one part of A's own personal information is memorized and stored in database 21 in A's terminal, A's and B's personal information can be optionally combined from among the information memorized and stored in database 21 in A's terminal. For example, in the situation where from A and B's personal information only, A's name and telephone number, and only B's address is memorized and stored in the database in A's terminal, a combination such as A's name and B's address or A's name and B's address can be optionally chosen from among B's or A's own usable personal information in A's terminal.

Next, in A's information terminal 104 the calculation means 110a forms a calculated result F(P1b',P1a), F(P2b', P1a), F(P1b',P2b',P1a,P2a), . . . , F(P1b',P2b', . . . ,Pmb',P1a, P2a, . . . ,Pna) etc from the optional calculation F based on the optional combination chosen here (step S100). Next, in embodiment 2, the sending and reception means 110b in A's information terminal 104 sends the calculation result F(P1b', P1a), F(P2b',P1a), F(P1b',P2b',P1a,P2a), . . . ,F(P1b', P2b', . . . ,Pmb',P1a,P2a, . . . ,Pna) etc, which is based on the optional combination chosen here, to the server 100 of the network service provider (step S101). In server 100, the calculation result F(P1b',P1a), F(P2b',P1a), F(P1b',P2b',P1a, P2a), . . . ,F(P1b',P2b', . . . ,Pmb',P1a,P2a, . . . ,Pna) etc, which is based on the optional combination chosen in user A's terminal 104, is received by the sending and reception means 108a. The table construction means 108b correlates and registers (23) the received calculation result F(P1b',P1a), F(P2b', P1a), F(P1b',P2b',P1a,P2a), . . . ,F(P1b',P2b', . . . ,Pmb',P1a, P2a, . . . ,Pna) etc with A's network service identification tag IDa or the information required for a connection and memorizes and stores this in database 102 (step S102). Further, the sending and reception of data and the calculation via the optional function in server 100 and A's information terminal 104 can be processed by the computer program, middleware and application which operate on the operating system installed in data process means 108 and 110.

Similarly, in FIG. 2, the hash value formation means 112a in user B's information terminal 106 forms one or more optional combinations of A's personal information P1a', P2a', . . . ,Pna' which is memorized and stored in database 22 and B's own personal information P1b,P2b, . . . ,Pnb which is memorized and stored in database 22 (step S103). Here, for example, similar to P1a and P1b, among information of the same sign and number, the personal information can be of the same category or a different category. Further, the information used here does not have to be information which can specify an individual called generally as personal information but could be general information such as a password which is decided in advance by the users who wish to communicate. It is possible to optionally combine with a permutation A's personal information and B's personal information in user B's information terminal 106. In other words, the combination of A and B's personal information can be (P1a',P1b), (P2a',P1b), (P1a',P2a',P1b,P2b), . . . ,(P1a',P2a', . . . ,Pna', P1b,P2b, . . . ,Pmb) etc or the calculation means 112a in B's terminal 106 calculates an optional combination from among these. Here, A's own personal information P1a, P2a, . . . ,Pna which is memorized and stored in the database 21 of A's information terminal, and A's own personal information P1a', P2a', . . . , Pna' which is memorized and stored in the database 22 of B's information terminal cane be the same number or not the same number. Similarly, B's own personal information P1b, P2b, . . . , Pnb which is memorized and stored in the database 22 of B's information terminal, and B's personal information P1b', P2b', . . . , Pnb' which is memorized and stored in the database 21 of A's information terminal can be the same number or not the same number.

Usually, A's personal information which is memorized and stored in database 22 in user B's terminal is fewer when compared to B's own information P1b,P2b, . . . ,Pnb in B's terminal. For example, B knows a lot of information such as B's own name, address, telephone number, birthplace etc, and this is often memorized and stored in database 22 in B's terminal. However, A's information, such as name and telephone number only, is usually restricted as it is another's personal information. Even in such circumstances, the combination of A's personal information and B's personal information which is combined in user B's terminal can be an optional combination of one or more which can be made from one of those which is memorized in database 22 of B's terminal. Also, there is no need for all of B's and A's personal information which is stored in database 22 in B's terminal to be combined and user B can optionally choose that combination.

Further, where only one part of B's own personal information is memorized and stored in database 22 in B's terminal, one part of B's personal information and one part of A's personal information can be optionally chosen. For example, in the case where only B's telephone number among B's personal information or only A's address among A's personal information is memorized and stored in the database in B's terminal, it is acceptable if the only possible combination becomes A's telephone number and B's address.

The calculation means 112a within B's information terminal 106 forms a calculation result F(P1a',P1b), F(P2a',P1b), F(P1a',P2a',P1b,P2b), . . . ,F(P1a',P2a, . . . , Pna',P1b, P2b, . . . ,Pnb) etc, which is calculated by the optional calculation F based on the character string (P1a',P1b), (P2a',P1b), (P1a',P2a',P1b,P2b), . . . ,(P1a',P2a', . . . ,Pna',P1b, P2b, . . . ,Pnb) etc combined by the combination chosen here (step S103). Next, the sending and reception means 112b of B's information terminal 106 sends the calculation result F(P1a',P1b), F(P2a',P1b), F(P1a',P2a',P1b,P2b), . . . ,F(P1a', P2a', . . . , Pna',P1b,P2b, . . . ,Pnb) etc, which is based on the optional combination chosen here, to the server 100 of the network service provider. The data process means 108 of server 100 receives the calculation result F(P1a',P1b), F(P2a', P1b), F(P1a',P2a',P1b,P2b), . . . , F(P1a',P2a', . . . ,Pna',P1b, P2b, . . . ,Pnb) etc sent by B's terminal 106 via the sending and reception means 108b. The table construction means 108b correlates and registers (24) the calculation result F(P1a', P1b), F(P2a',P1b), F(P1a',P2a',P1b,P2b), . . . ,F(P1a', P2a', . . . ,Pna',P1b,P2b, . . . ,Pnb) etc with B's network service identification tag or the information required for a connection and memorizes and stores this in database 102 (step S105). Further, the sending and reception of data and the calculation via the optional function in B's information terminal 106 can be processed by the computer program, middleware and application which operate on the operating system installed in the data process means.

Next, in FIG. 2, when A wishes to communicate with B, the calculation means 108a forms one or more calculation results F(P1a,P1b'), F(P2a,P1b'), F(P1a,P2a,P1b',P2b'), . . . ,F(P1a, P2a, . . . ,Pna,P1b',P2b', . . . ,Pmb') etc calculated via the optional calculation F of the optional combination of B's personal information and A's own personal information within user A's information terminal 104 (step S106). This optional calculation F which takes place in A's information terminal 104 can be any calculation, however, the same calculation F as the optional calculation F used when user B's information terminal 106 registers on the server the calculation result of user A's personal information and B's personal information stored on database 22 (step S102 and step S105) is requested. However, the combination of B's personal information and A's own personal information needed for the requested search, does not have to be the same as the combination of A's personal information and B's own personal information already registered in advance by B on server 100. And, the sending and reception means 110b of A's information terminal 104 sends the calculation result F(P1a,P1b'), F(P2a,P1b'), F(P1a,P2a,P1b',P2b), . . . ,F(P1a,P2a, . . . , Pna,P1b',P2b', . . . ,Pmb') etc of the character string combination of B's personal information and A's own personal information optionally combined here to server 100 of the network service provider and a search request (25) is made to server 100 (step S107). The calculation result F(P1a,P1b'), F(P2a,P1b'), F(P1a,P2a,P1b',P2b), . . . ,F(P1a,P2a, . . . ,Pna, P1b',P2b', . . . ,Pmb') etc sent from A's information terminal 104 is received by the sending and reception means 108b of the data process means 108 in server 100. And, the search means 108c of the data process means 108 searches for a calculation result match from these calculation results F(P1a, P1b'), F(P2a,P1b'), F(P1a,P2a,P1b',P2b), . . . ,F(P1a, P2a, . . . ,Pna, P1b',P2b', . . . ,Pmb') etc, which have been sent from A's information terminal 104, and B's identification tag which has been registered on database 100 or the calculation result F which has been correlated with the connection information (step S108). Here, in embodiment 2, B's identification tag IDb or the calculation result F(P1a',P1b), F(P2a,P1b'), F(P1a',P2a',P1b,P2b), . . . ,F(P1a',P2a', . . . ,Pna',P1b, P2b, . . . ,Pnb) etc, which has been correlated with the required information for a connection, has already been registered by B on the network service provider's server 102. For this search request from A, the search means 108c of the network service provider's server 100 detects (26) within database 100 a match between these calculation results F(P1a,P1b'), F(P2a,P1b'), F(P1a,P2a,P1b',P2b), . . . ,F(P1a,P2a, . . . ,Pna, P1b',P2b', . . . ,Pmb') etc, which have been sent from A's information terminal 104, and B's identification tag which is registered on database 100 or the calculation result F which has been correlated with the information required for a connection (namely, one or more of F(P1a,P1b')=F(P1a',P1b), F(P2a,P1b')=F(P2a',P1b), F(P1a,P2a,P1b',P2b)=F(P1a', P2a',P1b,P2b), . . . ,F(P1a,P2a, . . . ,Pna,P1b',P2b, . . . ,Pm b')=F(P1a',P2a', . . . ,Pna',P1b,P2b, . . . ,Pnb). Based on this detection result, the server 100 sends user B's network service ID or B's network service identification badge or the information required for a connection to user A's information terminal 104. And, communication between user A's information terminal and user B's information terminal is established (step S109). Also, for this search request, if the search means 108c in the network service provider's server 100 does not detect one match between the calculation result F(P1a, P1b'), F(P2a,P1b'), F(P1a,P2a,P1b',P2b), . . . ,F(P1a, P2a, . . . ,Pna,P1b',P2b', . . . ,Pmb') etc, which is sent from A's information terminal 104 in order to search for B, and the calculation result F which is correlated with the connection information such as B's network ID registered on server 100, then server 100 does not send the required information for a connection or user B's network service ID such as B's network service identification tag to user A's information terminal 104 (step S110).

Here, the calculation result F(P1b',P1a), F(P2a,P1b'), F(P1b',P2b',P1a,P2a), . . . ,F(P1b',P2b', . . . ,Pmb',P1a, P2a, . . . ,Pna) etc of the optional combination of B's personal information and A's own personal information which is sent from A's information terminal 104 to the server 100 for the search of B and the calculation result F(P1a',P1b), F(P2a', P1b), F(P1a',P2a',P1b,P2b), . . . ,F(P1a',P2a', . . . ,Pna',P1b, P2b, . . . ,Pnb) of the optional combination of A's personal information and B's own personal information which is stored in database 102 and which is sent in advance from B's information terminal 106 to the server 100 does not have to be a combination of the same category of personal information but if it is a combination of one or more of the same personal information, in a search request for B from A, the search means 108c of server 100 uniquely specifies B on this network service and the sending and reception means 108a of the server 100 can send the required information for a connection or the identification tag which has been correlated with the calculation result of the combination of personal information registered by B to A's information terminal 104. For example, on B's terminal, a combination of A's name and B's own name and A's telephone number and B's own name is selected and these combined calculation results are stored in database 102 on server 100. In the case where A's terminal 100 makes a search request for B's terminal 106 and an inquiry is made of the calculation result of each combination of B's address and A's own telephone number and B's name and A's own telephone number, the calculation result sent to the server 100 by B's terminal 106 and the calculation result inquired by A for a search of B are not all the combinations of the same personal information but because one calculation result of the same combination, such as A's telephone number and B's name, is included in both of these calculation results, the search means 108c of server 100 detects a match of the calculations and the sending and reception means 108a sends B's identification tag to A's terminal 104.

Here, a hash calculation result which is created in the step S103 by user B who is the object of a search, and which is sent to the server 100 in step S104, and which is correlated and registered with B's identification tag IDb in database 102 in step S105, and which is memorized in both the database 21 of A's information terminal who searches, and the database 22 of B's information terminal, may be one or more calculation results among a common wild card information [*] across this entire network service, and B's own information P1b, P2b, . . . , Pmb which is memorized in the database 22 of B's information terminal 106, and the calculation result F (*, P1b), F (*, P2b), . . . F (*, Pmb), F (*, P1b, P2b), . . . , F(:, P1b, P2b, . . . . Pmb). In this case, for example, user A who searches, generates a hash calculation result F (*+Pb') of B's personal information Pb' which is memorized in the database 21 of A's information terminal 104 and this wild card character string [*] in step S106 and by sending this to the server 100 in step S107, when a search for user B is requested and detects a match with H (*+Pb) to the search request by H (*+Pb') in step S108, and in the step S109, it is possible to send the identification tag IDb of B, who is the object of a search, and which is correlated with H(*+Pb) and memorized in step S109. In this way, B which is the object of a search, According to the system and means of the present invention related to this embodiment, compared to the conventional means shown in FIG. 1, there are a further three effects in addition to the three shown in embodiment 1.

Firstly, according to embodiment 2, when two people search for other on the network service, even if B's personal information which is stored on A's terminal 104 and A's personal information which is stored on B's terminal 106 is not the same, A can search for B and B can search for A. For example, in the conventional means where a user who is searched for, as shown in FIG. 1, registers their name on the server for the purposes of a search and the searcher searches for the name directly on the server, when A's terminal 104 searches for B's terminal 106 on the network service there is a need for B's name to be first stored on A's terminal 104 before a search request is made to server 100 regarding the name and, alternatively, there is a need for A's name to be stored on B's terminal 106 before a search request to the server 100 is made regarding A's name when B searches for A. That is to say, when two people searched for each other, there is a need to inquire to the server of each name only after personal information of the same category is stored on both terminals such as B's name in A's terminal and A's name in B's terminal. However, according to the means shown in embodiment 2, even in the case where A and B each store personal information of a different category on each terminal such as only B's telephone number on database 21 on A's terminal 104 and only A's address on database 22 on B's terminal 106, if A's terminal 104 has registered B's telephone number and A's own address and B's terminal 106 has registered A's address and B's own telephone number on database 102 of server 100 then A can search for B and vice versa.

Secondly, according to embodiment 2, not only when compared to the conventional means but even when compared to the means in embodiment 1 stated above, even if personal information with a low level of uniqueness is used when the search means 108*c* of server 100 receives a search request from the searcher, the possibility that the search object cannot be uniquely specified can be further reduced. For example, according to the means in embodiment 1, when A, who has an extremely popular name, searches for B, who also has an extremely popular name, there is a possibility that there are multiple F (Pa',Pb) among the calculation results registered in database 102 of the search server and, for example, when A tries to search for B there is a possibility that B cannot be uniquely specified on search server 100. However, according to the means of embodiment 2, when A searches for B, once the calculation result of one or more optional combinations of one or more of A's personal information and B's own personal information which is stored on database 22 of B's terminal 106 is registered on the server's database 108*c*, because an inquiry is made to server 100 of the calculation result of one or more optional combinations of one or more of B's personal information and A's own personal information which A has stored on the database of A's terminal, in most cases, a search is made for calculation results with multiple combinations of personal information and the possibility that a calculation result registered on database 108*c* of the server will be repeated is further reduced as compared with embodiment 1. For example, when A, whose name is extremely popular, searches for B, B's terminal 106 registers in advance the following four combination calculation results with database 108*c* of server 100, A's name and B's own name, A's place of work and B's name, A's name and B's own place of work, A's place of work and B's own place of work. Here, when A's terminal 104 requests a search to server 100 of the two calculation results, B's name and A's own name and B's name and A's own place of work, even if information with which it is difficult to uniquely specify a search partner such as an extremely popular name or place of work, it is possible to uniquely specify a search partner with almost certainty.
(Embodiment 3)

In embodiment 2 stated above, one or more pieces of information of the searcher who has been permitted to search by the searched user and the calculation result of one or more optional combinations from among the permutably calculations of one or more pieces of information of the searched user are correlated with the searched user's identification tag and registered in advance in the network service provider's server 100. The searcher inquires to the server 100 of the calculation result of one or more optional combinations of one piece of information or more of the searched user and one piece of information or more of the searcher's own information and in the case where there is a registered match the searched user's identification tag or the information required for a connection is sent.

In embodiment 3, the searched user in embodiment 2, registers in advance the calculation result in server 100 and in addition some sort of flag is formed on this calculation result and each of the searched user's information which is used as a base for this calculation. Following this, a group is made of each calculation result and the searched user's information, which is used as a base for the calculation result, and the searched user's identification tag is correlated with each group and registered in advance. Then, to the same inquiry as in embodiment 2 from the searcher the means of sending the flag of the calculation result and the searched user's identification tag to the searcher and its effects will be explained. Further, the systems and means and similar components of the present invention related to embodiment 2 are attached with a mark and will not be explained again. According to the systems and means of the present invention related to this embodiment, the operation flowchart which establishes communication between information terminal 104 and information terminal 106 is similar to FIG. 6 in embodiment one and thus here FIG. 6 will be referred to.

Figure 8:
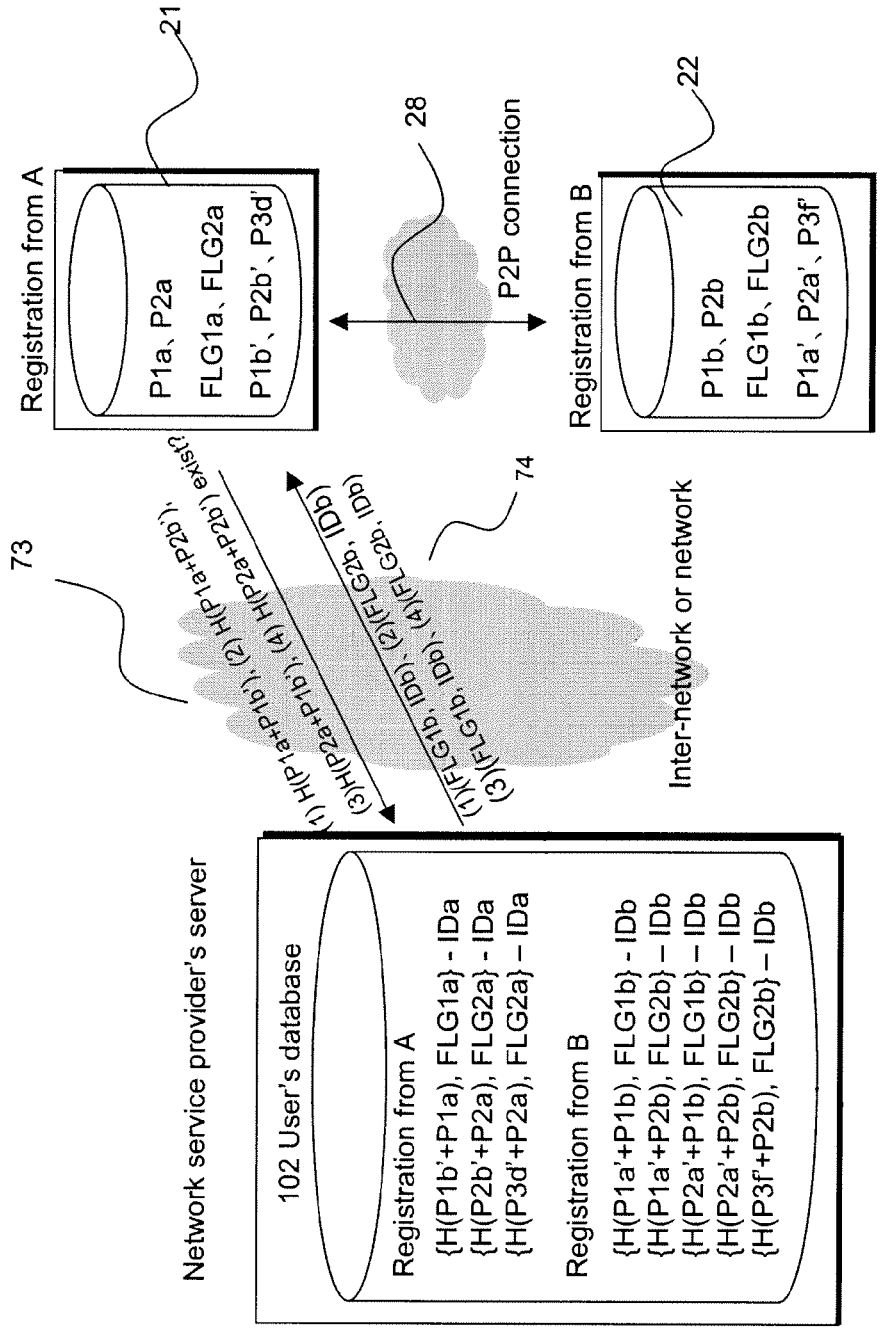
FIG. 8 shows the systems according to one embodiment of the present invention.

In the database 21 of user A's information terminal 104 in FIG. 8, A's own information P1*a* and P2*a*,B's information P1*b'* and Pb2*b'*, and D's information P3*d'*, the flag FLG1*a* which is related to A's own information P1*a* and the flag FLG2*a* which is related to A's own information P2*a* are memorized. Here, these flags (FLG1*a*, FLG2*a*) can be any information as long as it is related to each of A's information. For example, each piece of information is currently valid or invalid (for example, if the information is valid "1", if it is invalid "0" etc), the date each piece of information is formed (for example "20061225" etc), or the calculation means 110*a* can randomly form an optional numerical value on each piece of A's information. The calculation means 110*a* stores (step S100) in database 21 the calculation result via the optional combination of the hash function of A's own information or another's information, for example H(P1*b'*+P1*a*), H(P2*b'*+P2*a*), H(P3*d'*+P2*a*). Here, the calculation result which processed the character string connection of each piece of information via the hash function H is expressed as H(P1*b'*+P1*a*) etc. Next, the sending and reception means 110*b* of A's information terminal 104 sends these calculation results and A's information flag groups which are based on each calculation result {H(P1*b'*+P1*a*), FLG1*a*}, {H(P2*b'*+P2*a*), FLG1*a*}, and {H(P3*d'*+P2*a*), FLG2*a*} to the network service provider's server 100. Next, the data process means 108 of server 100 receives {H(P1*b'*+P1*a*), FLG1*a*}, {H(P2*b'*+P2*a*), FLG1*a*}, and {H(P3*d'*+P2*a*), FLG2*a*} via the sending and reception means 108*a*.

The table construction means 108*b* of server 100 registers (71) the calculation result {H(P1*b'*+P1*a*), FLG1*a*}, {H(P2*b'*+P2*a*), FLG1*a*}, and {H(P3*d'*+P2*a*), FLG2*a*} once it has been correlated with A's network service ID or the identification tag IDa necessary to uniquely specify A on this network service, or the information required for a connection, and memorizes and stores this in database 102 (stepS102). Further, the sending and receiving of data and calculations within server 100 or information terminal 104 can be processed by the computer programs, middleware or applications which operate on the operating systems included in data process means 108 and 110

Alternatively, in the database 22 of user B's information terminal 106, user B's own information P1b and P2b, user A's information P1a, similarly, user A's information P2a' and F's information P3f, further, flag FLG1b which is related with user B's own information P1b and flag FLG2b which is related with user B's own information P2b, are memorized. As stated above, the information in these flags can be any information as long as it is related to each of user B's information. The calculation means 112a memorizes (step S103) in database 22 the calculation result via the optional combination of the hash function of user B's own information or another's information, for example H(P1a'+P1b), H(P1a'+P2b), H(P2a'+P1b), H(P2a'+P2b), H(P3f+P2b). Next, the sending and reception means 112b of user B's information terminal 106 sends these calculation results and B's information flag groups {H(P1a'+P1b), FLG1b}, {H(P1a'+P2b), FLG2b}, {H(P2a'+P1b), FLG1b}, {H(P2a'+P2b), FLG2b}, and {H(P3f+P2b), FLG2b} which are based on each calculation result to the network service provider's server 100 (step S104). Next, the data process means 108 of server 100 receives {H(P1a'+P1b), FLG1b}, {H(P1a'+P2b), FLG2b}, {H(P2a'+P1b), FLG1b}, {H(P2a'+P2b), FLG2b}, and {H(P3f+P2b), FLG2b} via the sending and reception means 108a. The table construction means 108b of server 100 registers (72) the calculation result and flag group H(P1a'+P1b), FLG1b}, {H(P1a'+P2b), FLG2b}, {H(P2a'+P1b), FLG1b}, {H(P2a'+P2b), FLG2b}, and {H(P3f+P2b), FLG2b} once it has been correlated with B's network service ID or the identification tag IDb necessary to uniquely specify B on this network service, or the information required for a connection, and memorizes and stores this in database 102 (step S105). Further, the hash value formation within B's information terminal 106 can be processed by the computer programs, middleware or applications which operate on the operating systems included in the data process means.

One example of the calculation of combinations of various information is shown here and, as in embodiment 2, the amount of ones own or another's information which is stored in either user A's or B's terminal is optional in embodiment 3 too. Also, the calculation result which is sent from user A's or user B's terminal to the server 100 and registered in the database can be an optional combination calculation such as the optional number information P1a, P2a, ... ,Pna (n is an integer), user B's information P1b, P2b, ... ,Pmb (m is an integer). Also, each piece of information used here can be any information such as personal information, for example, names, addresses, telephone numbers, photographs, text etc. Also, the number of flags which are combined with each calculation result and registered with the server 100 can be any optional number above one.

The "dash" attached to the top right of each piece of information expresses the information of other users which is memorized and stored in each terminal by the terminal's owner. For example, if P1a and P1b are names, P2a and P2b are addresses and P3a and P3b are places of work then P1b' refers to B's name which A memorizes and stores in A's terminal 104. Also, for example, P2b refers to B's own address which is memorized and stored by B in B's terminal 106. For example, usually, P1b'=P1b, and P2b'=P2b, however, for example, if the information which is memorized and stored in whichever terminal is incorrect or old then this is not always the case.

Also, in embodiment 3, a character string combination hash function is used as the calculation. However, as in embodiment 2 shown above, the calculation used here can be an optional reversible calculation F or an irreversible calculation F. As already stated, when a reversible calculation is used here, among the effects of the present invention stated in embodiment 1, the level of security is lower compared to an irreversible calculation, however, the other effects of the present invention do not change. Further, the optional calculation F used here can be commutative or non-commutative in terms of variable personal information.

Next, in the present embodiment, when user A wishes to communicate with user B, the calculation means 110a in user A's information terminal 104 forms a hash calculation H(P1a+P1b'), H(P1a+P2b'), H(P2a+P1b') and H(P2a+P2b') of the character string combination of the combination of B's information and A's own information (step S106). At this time, A's and B's information which user A's information terminal combines for the purposes of a search, is not limited to this example and can be an optional combination. Also, this optional hash calculation which takes place in B's information terminal 106 can be any calculation F, however, the same calculation which user A's information terminal uses to register with the server 100 is requested. And, by sending the calculation result H(P1a+P1b'), H(P1a+P2b'), H(P2a+P1b') and H(P2a+P2b') to the network service provider's server 100 the sending and reception means 110b of user A's information terminal 104 makes a search request (73) to server 100 (step S107). The calculation result H(P1a+P1b'), H(P1a+P2b'), H(P2a+P1b') and H(P2a+P2b') which has been sent from information terminal 104, is received by the sending and reception means 108a of the data process means 108 in server 100. And, the search means 108c of the data process means 108 searches for a calculation result which is registered in database 100 and which matches the calculation result H(P1a+P1b'), H(P1a+P2b'), H(P2a+P1b') and H(P2a+P2b') which is sent from information terminal 104 (step S108).

Here, in the example shown in FIG. 8, H(P1a'+P1b), H(P1a'+P2b), H(P2a'+P1b) and H(P2a'+P2b) which is correlated with B's identification tag IDb or the required information for a connection with B, is registered by B in the database 102 of the network service provider. To this search request, the search means 108c in the server 100 of the network service means detects four matches in the database 100 of the calculation result (P1a'+P1b), H(P1a'+P12b), H(P2a'+P1b), H(P2a'+P2b) which has been sent from information terminal 104 and the calculation result which is registered and correlated with B's identification tag registered in database 100 or the required information for a connection (namely, H(P1a+P1b')=H(P1a'+P1b), H(P1a+P2b')=H(P1a'+P2b), H(P2a+P1b')=H(P2a'+P1b), and H(P2a+P2b')=H(P2a'+P2b)) (step S109). Based on this the server 100 sends to user A's terminal 104 the flag which corresponds to each of the four calculation results which user A's terminal 104 inquires (namely H(P1a+P1b')–FLG1b, H(P1a+P2b')–FLG2b, H(P2a+P1b')–FLG1b and H(P2a+P2b')–FLG2b) and user B's terminal identification tag IDb.

As in embodiment 1 and embodiment 2, user A's terminal 104 can communicate with user B based on user B's identification tag IDb or user B's connection information which has been obtained here. In addition to this, in embodiment 3, when user A's terminal uses flag FLG1b related to user B's information P1b' and the flag FLG2b related to user B's information P2b', which are used when user A searches for user B and which is sent from server 100, together with user B's identification tag IDb, in addition to the effects described in embodiment 1 and embodiment 2, the following described effects can be obtained.

Using the two examples shown below the effects in embodiment 3 will be explained. Here, in the embodiment shown in FIG. 8, P1a is A's electronic mail address, P2a is A's telephone number, P1b is B's electronic mail address and P2b is B's telephone number. As until now, if no dash ['] is attached to these symbols then this refers to ones own information stored in ones own terminal and if a dash is attached, then this refers to another's information stored in ones own terminal. Further, P1a, P2a, . . . and P1b, P2b, . . . are not limited to this example and can be any kind of information In the first example, the flags FLG1b and FLG2b are each B's electronic mail address and telephone number memorized in user B's information terminal 22 and are flags which show whether they are currently valid or invalid (if they are valid "1", if they are invalid due to old information etc "0"). Here A's terminal 104 inquires to server 100 of (1)H(P1a+P1b'), (2)H(P1a+P2b'), (3)H(P2a+P1b') and (4)H(P2a+P2b') and the result, B's identification tag and B's flags which correspond to these four hashes which have been inquired, are received by server 100 (74). For example, as shown in FIG. 8, in this case, A's terminal receives FLGb1 as the flag which corresponds to (1)H(P1a+P1b'). Therefore, if the received FLGb1=1 then it is understood that B's electronic mail address P1b' which A stores in A's terminal 104 is currently valid. On the other hand, if the received FLGb1=0 then it is understood that that B's electronic mail address P1b' which A stores in A's terminal 104 is currently invalid. In this first example, with regard to B's information which A's information terminal uses to search for B, there is the effect that it is possible to obtain the information's condition without communication being established between A and B. Compared to embodiment 1 and embodiment 2, when B's electronic mail address is old and currently invalid, by using this flag, this effect has the advantage that there is no need for A's information terminal to try to establish communication using an invalid communication means. Here, flags FLG1b and FLG2b are not hash calculated and because the flag information itself is registered in server 100 the security retention effect, given as the first advantage in embodiment 1, when an irreversible calculation is used, is not applicable to this flag itself. However, in this example, the only information included is whether FLG1b, FLG2b are either valid or invalid and because the information which is related to these flags is a hash value and reversible, even if this is leaked, from the view point of the security retention of user B's information, there is no problem.

In the second example, the flags FLG1b and FLG2b each use the start date of B's electronic mail address and telephone number which are memorized in user B's information terminal 22 (for example 2006/12/25 is "20061225" etc) or a numerical value which is randomly formed by the calculation means 112 of B's information terminal 22. Here, A's terminal 104 inquires to server 100 of (1)H(P1a+P1b'), (2)H(P1a+P2b'), (3)H(P2a+P1b') and (4)H(P2a+P2b') and the result, B's identification tag IDb and each of B's flags which corresponds to the four hashes which have been inquired are received by server 100 (74).

Incidentally, the advantage of using the hash function in a search (irreversible compressed calculation) in embodiment 1, 2 and 3, is security retention.

On the other hand, one fault is that a collision of the calculation result may occur, that is to say, even if Pa≠PbH, (Pa)≠H(Pb) is not always guaranteed.

In other words, in this second example, to the search request from user A's information terminal 104 to the server 100 of the four hash values, as a result of a hash calculation result collision, in addition to the four values from (1) to (4) stated above) a match is sometimes detected with a different hash value registered by a third user other than user B (for example, {H(P1x'+P2y),FLG2y} which user Y combines and registers with the information of user X).

In this case, in embodiment 1 and embodiment 2, in user A's terminal 104, one of the five hash values obtained here is a registration from user B and there is no means to determine which match caused by the hash calculation collision is incorrect. On the other hand, according to the means of embodiment 3, because it is expected that the same flag FLG1b will be returned to the inquiry (1) and (3) and the same flag FLG2b will be returned to the inquiry (2) and (4) by server 100, among the five matches which have returned from server 100, an incorrect match is detected for some reason such as the hash calculation result clash, between the hash value which has the only different flag FLG2y and a registration which is possible to presume is a registration from someone other than user B by user A's terminal.

In embodiment 3, a flag which is attached to each piece of B's information which became the base for forming each hash value which is registered by B, is registered in server 100. However, this flag is not B's information which became the base for forming the hash value but may be a means which registers in server 100 the flag which is related with B's identification tag.

(Embodiment 4)

Figure 9:
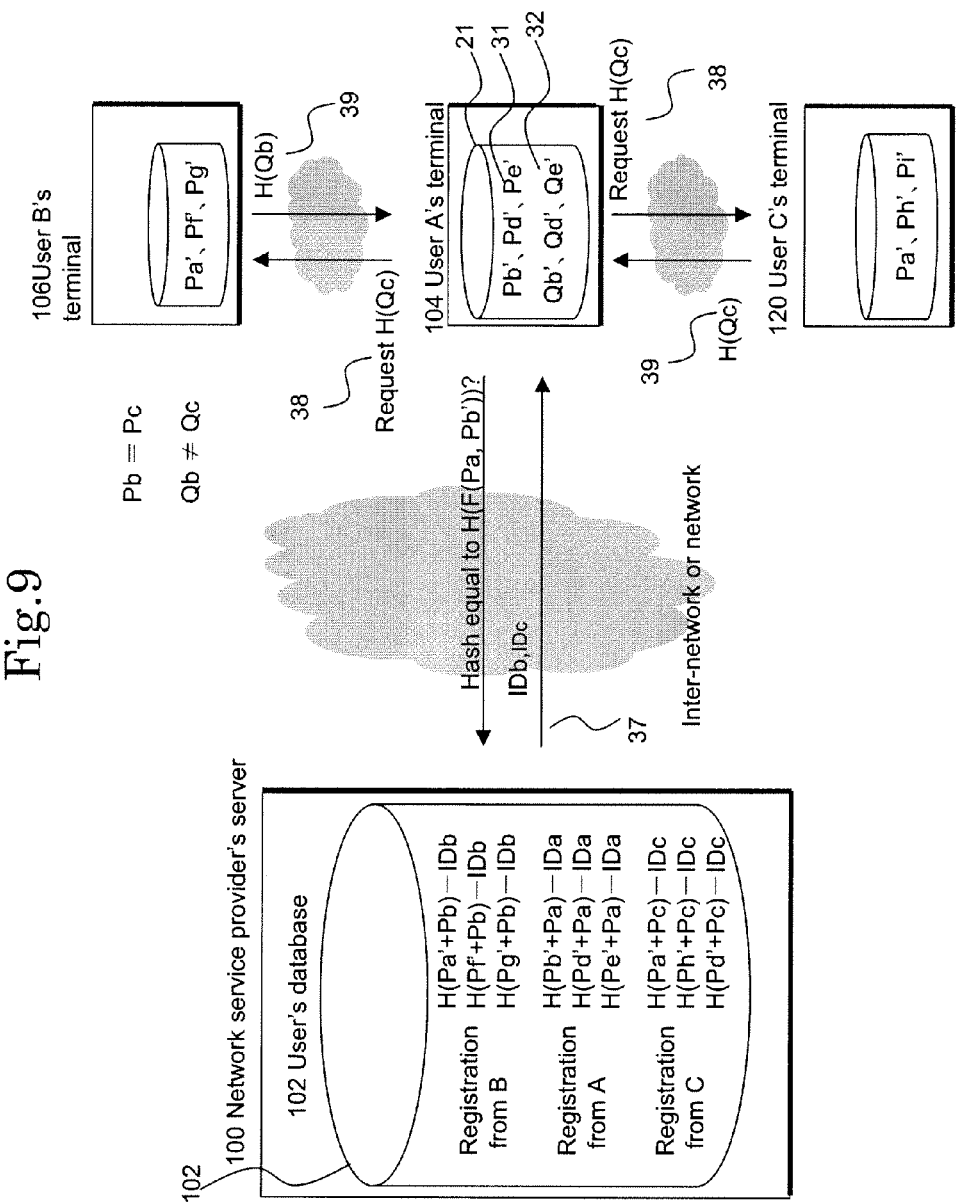
FIG. 9 shows the systems according to one embodiment of the present invention.

In embodiment 4, according to the methods of embodiment 1 or embodiment 2 stated earlier, to the search request of one or multiple calculation results from a searcher multiple matches are detected in database 102 of server 100. When a searcher cannot uniquely specify a searched user, by adding a further step which performs a hash exchange of separate private information among the multiple searched users and searchers where a match has been detected, a method for uniquely specifying an intended searched user will be explained. FIG. 9 is an example in embodiment 4 of the present invention, user B and C of this network service have the same surname and forename, user A knows both user B and C and using a search of the present invention A searches for B who wishes to communicate, and shows a system and method for uniquely specifying B. Further, the same mark is attached to components which are similar to the system and methods of the present invention related to embodiment 1 or embodiment 2 and thus may not be explained again.

Further, similar to the example shown in embodiment 1, in embodiment 4 a search method is shown where once the searched user registers in advance the calculation result via the hash function of the character string combination of the names of the searcher and the searched user in the database 102 of server 100, when the searcher performs a search the searcher's terminal inquires with server 100 of the calculation result via the hash function of the character string combination of the names of the searcher themselves and the searched user.

However, as in the explanation given in embodiment 1, the information which becomes the object of a calculation is not limited to names and could be any information such as addresses, place of work, family information or various preferences. Also, a hash algorithm can be used such as SHA-1 or MD5 for the calculation used here and the calculation performed here is not limited by the character string combination hash calculation but could be an optional calculation.

Further, as stated above in embodiment 2, in embodiment 4, in a search an optional combination from among permutative combinations of the personal information of multiple searchers and the personal information of multiple searched users can be chosen and a result which has been optionally calculated can be used for these combinations. As stated earlier in embodiment 1 and embodiment 2, the calculation used here can be permutative calculation or a non-permutative calculation and can be a reversible calculation or an irreversible calculation.

Now, as shown in the example in FIG. 9, the names of each of B, D and E who are friends of A and which A knows directly are stored as Pb',Pd',Pe'31, and the names of the cities in which they live are each stored as Qb',Qd',Qe'32 in the database 21 of user A's information terminal 104. Also, the names of each of A, F and G who are friends of B and which B knows directly are stored as Pa',Pf',Pg'33 in user B's information terminal 106. Also, the names of each of A, H and I who are friends of C and which V knows directly are stored as Pa',Ph',Pi'34 in user C's information terminal 120. Further, it is needless to state that other user's information can also be memorized in server 100, information terminal 104, information terminal 106 and information terminal 120.

However, in the example shown in FIG. 9, user B and user C have the same surname and forename (Pb=Pc) but the cities in which they live are different (Qb≠Qc). Also, the personal information that A, B and C each have stored on their information terminals about themselves and each other is correct and current.

Figure 10:
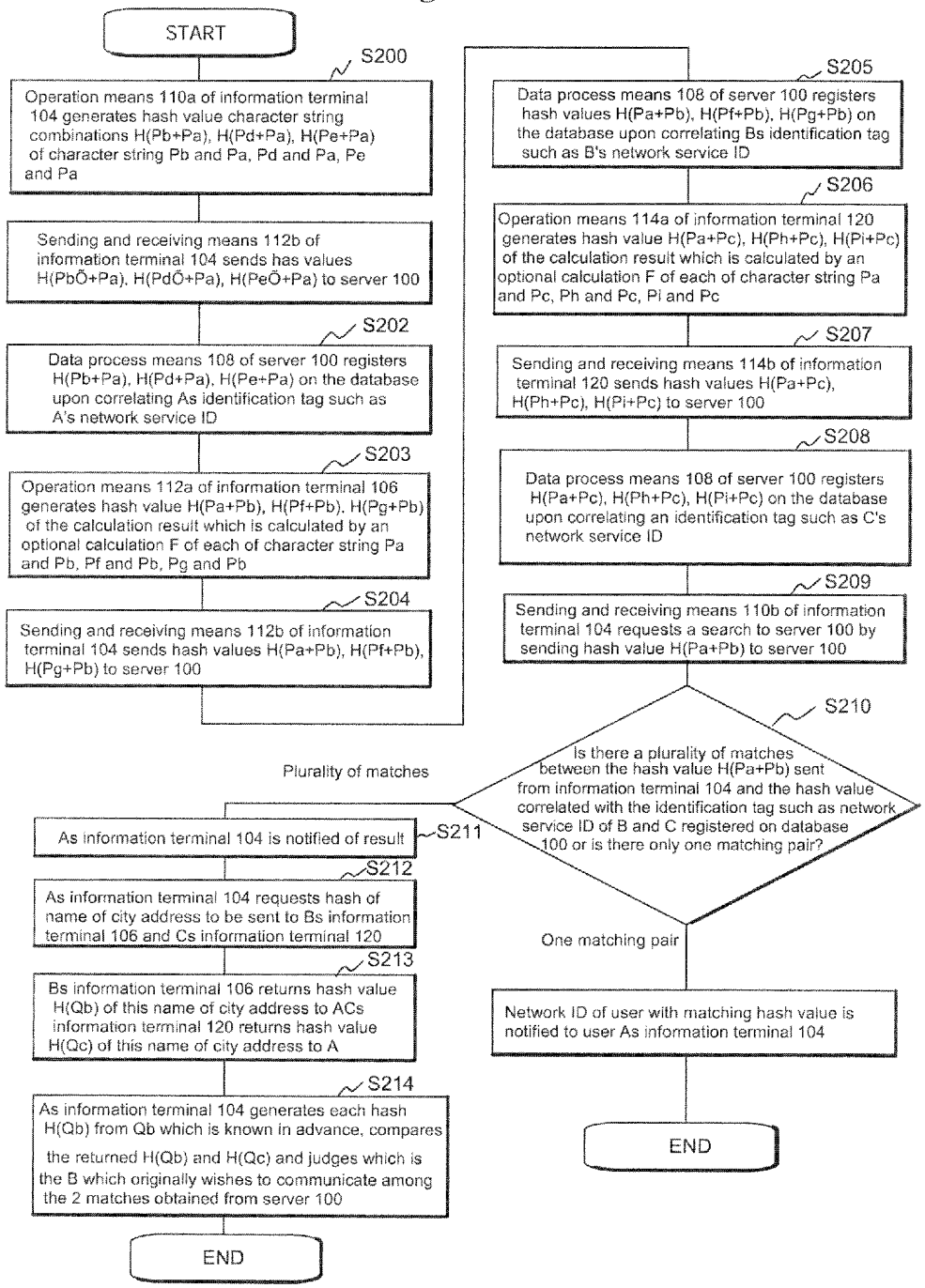
FIG. 10 shows the systems according to one embodiment of the present invention.

FIG. 10 is flowchart of the systems and methods of the present invention related to this embodiment In the example shown in FIG. 9, first the calculation means 110a of the data process method of A's terminal 104 calculates the hash function of the character string combination of Pb' which is the character string which expresses B's name and Pa which is the character string which expresses A's name (step 200). Similarly, the calculation method 110a of the data process method 110 of A's terminal 104 forms a hash value H(Pd'+Pa), H(Pe'+Pa) of each character string combination of D, A and E (step S300). The sending and reception means 110b of information terminal 104 sends these three hash H(Pb'+Pa), H(Pd'+Pa), and H(Pe'+Pa) to server 100 of the network service operator The data process means 108 of server 100 receives the three hash values H(Pb'+Pa), H(Pd'+Pa), and H(Pe'+Pa) and after correlating and registering them with A's network service identification tag or the required information for a connection memorizes and stores them in database 102 (step S202).

Similarly, the calculation means 112a of the data process method 112 of user B's information terminal 106 forms hash values H(Pa'+Pb), H(Pf'+Pb), and H(Pg'+Pb) of the character string combination of B's own name and the names of B's friends A, F and G who B thinks it acceptable to communicate with (step S203). The sending and reception means 112b of information terminal 106 sends these three hash values H(Pa'+Pb), H(Pf'+Pb), and H(Pg'+Pb) to the server 100 of the network system provider (step S204).

Server 100 receives these three hash values H(Pa'+Pb), H(Pf'+Pb), H(Pg'+Pb) and after correlating them with B's identification tag IDb or the information required for a connection registers them and memorizes and stores them in database 102 (step S205).

Similarly, the calculation method 114a (not illustrated) of the data process means 114 (not illustrated) of user C's information terminal 120 forms a hash value H(Pa'+Pc), H(Ph'+Pc), and H(Pi'+Pc) of the character string combination of C's own name and the names of C's friends A, H and I who C thinks it acceptable to communicate with (step S206). In order to form the hash value in user C's information terminal 120 any algorithm can be used but use of the same algorithm as the formed hash value in B's information terminal 106 is requested. If the calculation of personal information which takes place in B's information terminal 106 is not a character string combination hash value but an optional function then the calculation used in user C's terminal 120 must be the same as the calculation used in B's information terminal 106. The sending and reception means 114b (not illustrated) of user C's information terminal 120 sends these three hash values H(Pa'+Pc), H(Ph'+Pc), and H(Pi'+Pc) to the server 100 of the network service provider (step S207).

Server 100 receives the three hash values H(Pa'+Pc), H(Ph'+Pc), and H(Pi'+Pc) and after correlating them with C's identification tag IDc or the required information for a connection registers them and memorizes and stores them in database 102 (step S208).

In the example shown in FIG. 9, when A wishes to communicate with B the calculation means 110a of A's information terminal 104 forms a hash value H(Pa+Pb') character string combination of B's name and A's own name and the sending and reception means 110b requests a search (36) by sending these to server 100 of the network service operator (step S209). At this time, the algorithm which forms the hash value which is used for the search in A's information terminal 104 is requested to be the same as the algorithm which forms the hash value used when the hash value of the character string combination of the names of the owner of each terminal and the names of the others which are stored in each terminal are registered in B's and C's information terminal 106 and 120. Also, if, in B's information terminal 106 and in C's information terminal 120, the optional calculation F of the names of the owners of each terminal and the names of the others which are stored in each terminal is registered in the server, the calculation used for the search in A's information terminal 104 here, A's own name and the optional calculation of B's name stored in database 21 in A's terminal, must be the same as the calculation used in B's information terminal 106 and C's information terminal 120.

In answer to the search request to the server of the network service provider from A's information terminal 102 the search means 108c of server 100 searches for a hash value which matches H(Pa+Pb') which requested this search, from among the hash values registered in advance in B's information terminal 106 and C's information terminal 120 (step 210). In this example, because user B and user C have the same surname and forename (Pb=Pc) the search means 108c of server 100 detects multiple matches between the hash value H(Pa+Pb') sent from A's information terminal 104, the hash value H(Pa'+Pb) which is registered in advance by B's information terminal 106 and the hash value H(Pa'+Pc) which is registered in advance by C's information terminal 120. In this case, the server 100 reports (37) to information terminal 104 the network service identification tag IDb and IDc of B and C who detected the multiple matches or the required information for a connection (step S211). At this time, from the search A's information terminal 104 is unable to uniquely specify the information terminal 106 of B who wishes to communicate on the network service and B's information terminal 106 and C's information terminal 120 remain as candidates.

Accordingly, next, in the example shown in FIG. 9, using B and C's identification tag IDb and IDc or the information required for a connection which has been reported (37) to A's information terminal 102, through the server 100 of the network service provider or by direct connection between A's information terminal 102, B's information terminal 106 and C's information terminal 120, A's information terminal 104, for example, requests (38) to B's information terminal 106 that the hash value H(Qb) of the name of the city Qb where B lives or to C's information terminal 120 the hash value H(Qc) of the name of the city Qc where C lives be each sent to A's terminal 104 (step 212). Following this request, B returns (39)

the hash value H(Qb) of the name of the city where B lives and C returns the hash value H(Qc) of the name of the city where C lives (step 213). Here, the algorithm which is used to form the hash values which are used in user A's information terminal 104, user B's information terminal 106 and user C's information terminal 120 can be any algorithm and the same calculation or the same algorithm can be used in each information terminal. Also, the calculation used in user A's information terminal 104, user B's information terminal 106 and user C's information terminal 120 is not limited to a hash function and can be any calculation. If the optional calculation used here is an irreversible calculation then in order for A's terminal 104 to uniquely specify B's terminal 106, because A cannot decipher or reconstruct B's or C's personal information which is sent from A's terminal 104 from B's terminal 106 and C's terminal 120, by this method, A cannot obtain the personal information of C who is unrelated and thus the level of concealment of personal information is higher than when a reversible calculation is used.

In the example shown in FIG. 9, because the names of the cities in which B and C live are different (Qb≠Qc) A's terminal 104 forms a hash value H(Qb') from the information of others (32) which is stored in advance in the database 21 and by comparing this (39) with H(Qb) which has been returned by B's terminal 106 and H(Qc) which has been returned by C's terminal 120 and from the two matches obtained from server 100 judges which is B who originally wishes to communicate (step 214).

Figure 11:
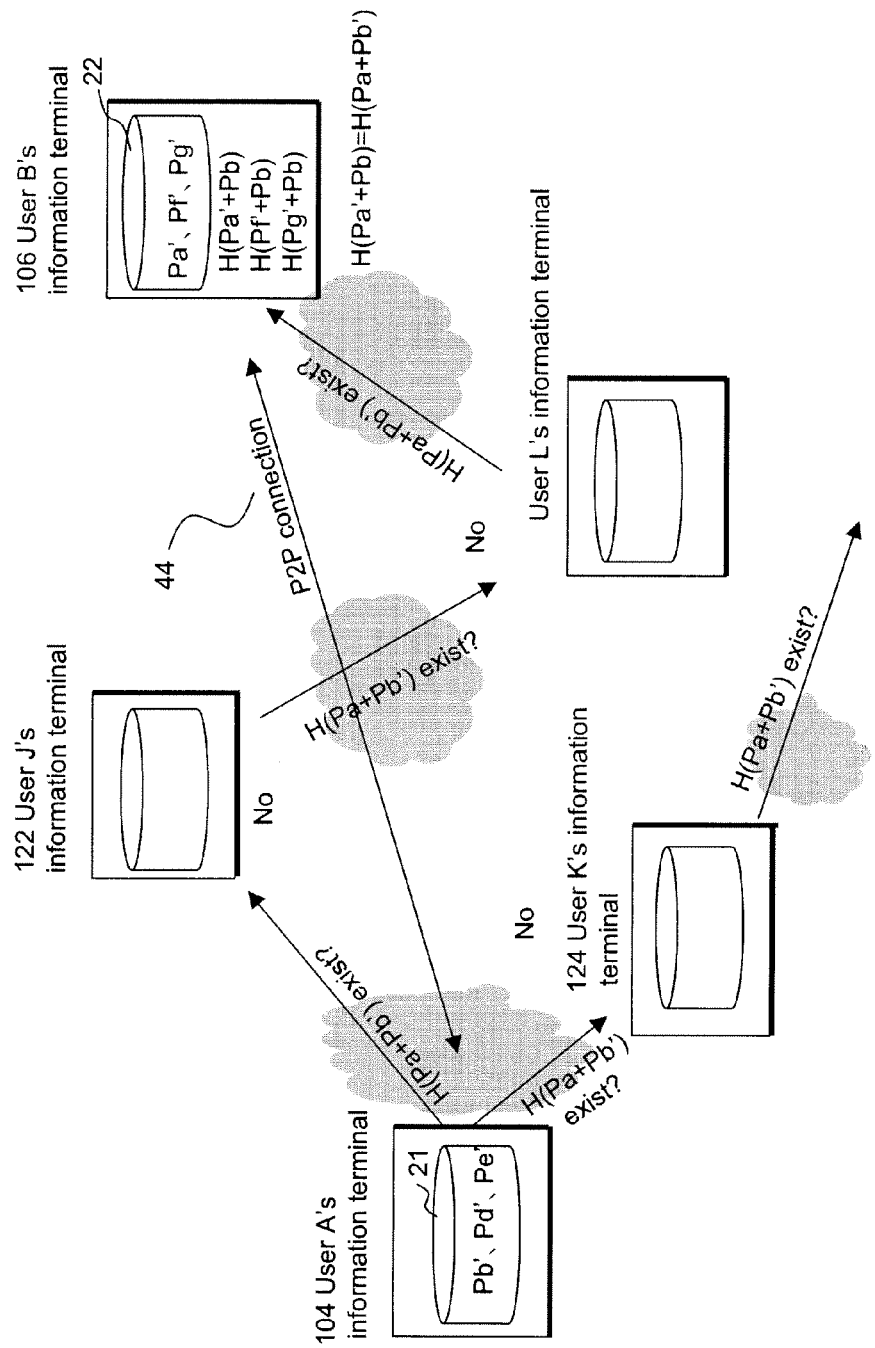
FIG. 11 shows the systems according to one embodiment of the present invention.

In the example shown in FIG. 11, if for example C knows the name of the city Qb where B lives and C has malicious intentions and plans to become B, after calculating the hash value H(Qb') from Qb' which C knows and which is in C's terminal 120, then C, who remains as a candidate returns this to A and can become B. In order to prevent this, using a key equipped hash algorithm which uses a secret key, when A's information terminal 104 requests a hash value from B's information terminal 106 or C's information terminal 120, it forms a secret key sb for B and a separate secret key sc for C and after sending each of these to B's terminal 106 and C's terminal 120, B's information terminal 106 and C's information terminal 120 calculate each hash value Hsb(Qb), and Hsc(Qc) based on the secret key given by A and returns these back to A' terminal 104. C does not know the secret key sb which A sent to B, for example, even if C sends Hsc(Qb) to A's terminal 104 with the intention of becoming B, because the expected value Hsb(Qb) of the secret key's hash value which is calculated in A's terminal 104 and sent back to A's terminal 104 by B's terminal 106 is not equal to Hsc(Qb) sent back by C, it is possible to distinguish that the hash value pretending to be B sent back from C is not the value sent by B.

Also, if, as the example shown in FIG. 11, Pb=Pc and Qb=Qc, then as a result of multiple matches of this hash check result, even a hash check by a method as the one described above, B who wishes to communicate cannot be uniquely specified. In such a case, the hash of personal information other than B's name and name of the city in which B lives which is stored in database 21 of A's terminal 104, is requested from B's information terminal 106 and C's information terminal and by A's information terminal 104 repeating the above described step where the hash is checked until A's information terminal 104 can uniquely specify B's information terminal 106, the information terminal 106 of B who originally wishes to communicate can be uniquely specified. (Embodiment 5)

Using an information terminal connected to a network such as an IP telephone, network game and SNS, a network service can realize data exchange and communication between specified individuals including a search for a communication partner by a P2P connection.

According to the conventional method, when A's terminal searches for B's terminal on this network service, first A queries to their direct connection P2P connected terminal (proximal node) for a search of B's personal information which can uniquely specify B such as an electronic mail address. If there is no match of the information queried with the proximal node then the proximal node which receives the query transfers the query to another proximal node. The proximal node again continues to transfer the query to other nodes than itself in a packet relay system and continues to search for B until it comes across B's personal information. The terminal which has B's personal information returns the required information for a P2P connection with B to A and a new P2P connection between A and B is realized. In this case, the danger of obtaining the required information for a connection with A's terminal or B's terminal by a terminal which relays this search request is great, security cannot be maintained or a searched user cannot prevent being searched.

FIG. 11 is another embodiment of this invention. The system and method of the present invention related to this embodiment are effective in a search for a communication partner over a P2P network which accepts this kind of server. Further, the system and similar components of the present invention related to embodiment 1 to 3 are marked with the same symbol and may not be explained again.

In the example shown in FIG. 11, a user of a P2P network service calculates a character string combination of their own name and the name of the partner with which they think it is acceptable to communicate via a hash function and a hash value is formed from the calculation result and stored in each terminal. For example, in FIG. 11, in the database 21 which is memorized and stored in A's information terminal 104, as personal information the names of B, D and E who are A's friends and who A knows are registered as Pb', Pd', Pe'. The situation shown in FIG. 11 shows that A believes it is safe to communicate with B, D and E. Also, in the database 22 of B's information terminal 106, the names of A, F and G who are B's friends and who B knows are memorized and stored as Pa', Pf', and Pg' as personal information.

However, the "dash" which is attached to each piece of information (names in embodiment 5) refers to others information which each terminal owner memorizes and stores in their own terminal. For example, in FIG. 11 Pb' refers to B's name which A records and stores in A's terminal 104. Also, Pb refers to B's own name which B memorizes and stores in B's terminal 106. Usually, Pb'=Pb, however, for example, if the information memorized and stored in whichever terminal is incorrect or old then this is not always the case.

In FIG. 11, in user A's information terminal 104 the calculation method 110 forms a combination Pb'+Pa of the character string Pb' which expresses B's name which is memorized and stored in database 21 and the character string Pa which represents A's own name which is memorized and stored in database 21 and with this combination character string, further memorizes and stores the calculation result H(Pb'+Pa) which is calculated via the optional hash function such as SHA-1, MD5 in database 21. Here, the combination character string which is processed via the hash function is expressed as the calculation result H(Pb'+Pa). Similarly, the calculation means 110a in A's information terminal 104 forms the calculation result H(Pd'+Pa), H(Pe'+Pa) which is calculated via the hash function after the character string which expresses each of the names of D and A, E and A are combined and memorizes and stores this in database 21.

Here, in the present embodiment, the calculation result via the hash function of the character string combination of others names and A's own name which is remembered in A's terminal 104 is used, however, the personal information used here is not limited to names and can be any information such as addresses, age, telephone numbers, electronic mail addresses, occupation, place of work, schools attended and birthplaces. Also, here, Pa is A's name which is memorized in A's terminal 104 but although personal information of the same category such as all names, for example Pb',Pd' and Pe' are the names of B, D and E, is used combinations of different categories of personal information can also be used such Pa is A's name, Pb' is B's address, Pd' is D's telephone number and Pe' is E's age. Further, the information used here does not have to be information which can specify an individual generally called personal information but may also be a password formed from general information decided in advance by the communicating users.

Also, in the present embodiment, for example, once the operation of the combination of the character string of Pb' and Pa is performed the calculation result H(Pb'+Pa) is used, however, this calculation result can be an optional calculation result F(Pb',Pa) which is uniquely decided based on Pb' and Pa. This optional calculation F(Pb',Pa) can be a reversible calculation, that is Pb' and Pa can be calculated back from (Pb',Pa) or an irreversible calculation, that is Pb' and Pa cannot be calculated back from (Pb', Pa). Also, this optional calculation F(Pb',Pa) can be a commutative calculation, that is F(Pb',Pa)=F(Pa,Pb') or a non-commutative calculation, that is F(Pb',Pa)≠F(Pa,Pb'). The hash calculation H(Pb',Pa) of the character string combination of this embodiment is simply one example using either a commutative or non-commutative calculation from among the optional calculations F(Pb',Pa). All the hash function calculation results of the character string combinations used in this embodiment and all embodiments herein can be the optional function calculation results spoken of here.

In FIG. 11, in user B's information terminal 106 the calculation means 112 forms a combination Pa'+Pb of the character string Pa' which expresses A's name which is memorized and stored in database 22 and the character string Pb which expresses B's own name which is memorized and stored in database 22 and with this combination character string it further memorizes and stores the calculation result H(Pa'+Pb) which is calculated via the optional hash function such as SHA-1, MD5 in database 22. This hash calculation H of the character string combination which takes place in B's information terminal 106 can be any hash calculation, however, the same H calculation as the hash calculation H which takes place in A's information terminal 104 is requested. Similarly, the calculation means 112a in B's information terminal 106 forms a hash calculation H(Pf'+Pb) and H(Pg'+Pb) of the character string combination of each of the names of F and B, G and B, and these three calculation results H(Pa'+Pb), H(Pf'+Pb), and H(Pg'+Pb) are memorized and stored in database 22.

Here, in the present embodiment, the calculation result via the hash function of the character string combination of others names and B's own name which is memorized in B's terminal 106 is used, however, the personal information used here is not limited to names and can be any information such as addresses, age, telephone numbers, electronic mail addresses, occupation, place of work, schools attended and birthplaces. Also, here, Pb is B's name which is memorized in B's terminal 106 but although personal information of the same category such as all names, for example Pa', Pf' and Pg' are the names of A, F and G, is used, combinations of different categories of personal information can also be used such as Pb is B's name, Pa' is A's address, Pf' is F's telephone number and Pg' is G's age.

Further, the information used here does not have to be information which can specify an individual generally called personal information but may also be a password formed from general information decided in advance by the communicating users.

In the situation here, the hash value formation means 110a of A's information terminal 104 which tries to search for B's information terminal 106 forms a hash value H(Pa+Pb'). Then, A's information terminal 104 puts out a query 43 for a search request for H(Pa+Pb') to a proximal node J (J&s information terminal 122) and a proximal node K (K's information terminal 124) for example, the formed hash value H(Pa,Pb') is added to the required information for a connection with A and which is encrypted by B's public key. If H(Pa+Pb') is not held in these adjacent nodes (J's information terminal 122 and K's information terminal 124) then the query is transferred to nodes neighboring J and K's information terminals. For example, user J's information terminal 122 transfers A's query to user L's information terminal which is an adjacent node. In this way, the query which A issues for the search request of B is transferred by packet relay and when this query arrives at B's information terminal 106, B's information terminal 106 detects for the first time a hash value match, namely H(Pa'+Pb)=H(Pa+Pb'). By this match B's information terminal 106 decodes with this public key, which becomes a private key, the required information for a connection with A's terminal 104 which has been encrypted with B's public key and upon receiving the required information for a connection with A's terminal sends the required information for a connection with B's information terminal 106 to A's information terminal 104 using this and a P2P connection 44 between A's information terminal 104 and B's information terminal 106 is realized Further, in the present embodiment, a hash calculation result of the combination of personal information of the same category such as A's own name and B's name which is memorized in A's terminal is used as the information H(Pa+Pb') inquired by A's terminal to the P2P networks adjacent node, however, personal information of different categories, for example, Pa as A's telephone number, Pb' as B's address, can be combined and used to inquire the hash value with the server 100. Further, the information used here does not have to be information which can specify an individual generally called personal information but may also be a password formed from general information decided in advance by the communicating users. In this case also, if the hash value which is inquired by A's terminal 104 to the P2P network via an adjacent node is equal to the hash value of the combination of personal information which is memorized and stored in B's information terminal 106 by B's information terminal 106 then B's information terminal 106 sends the required information for a connection with B to A's information terminal 104.

Also, in the present embodiment, for example, once the operation of the combination of the character string of Pb' and Pa is performed the calculation result H(Pb'+Pa) is used, however, this calculation result can be an optional calculation result F(Pb',Pa) which is uniquely decided based on Pb' and Pa. This optional calculation F(Pb',Pa) can be a reversible calculation, that is Pb' and Pa can be calculated back from (Pb',Pa) or an irreversible calculation, that is Pb' and Pa cannot be calculated back from (Pb',Pa). However, in the case where an optional calculation used here is a reversible calculation then the level of security cannot be guaranteed. Also, this optional calculation F(Pb',Pa) can be a commutative calculation, that is F(Pb',Pa)=F(Pa,Pb') or a non-commutative calculation, that is F(Pb',Pa)≠F(Pa,Pb'). The hash calculation H(Pb',Pa) of the character string combination used in this embodiment is simply one example using a commutative or non-commutative calculation among optional calculation F(Pb'+Pa).

(Embodiment 6)

Figure 12:
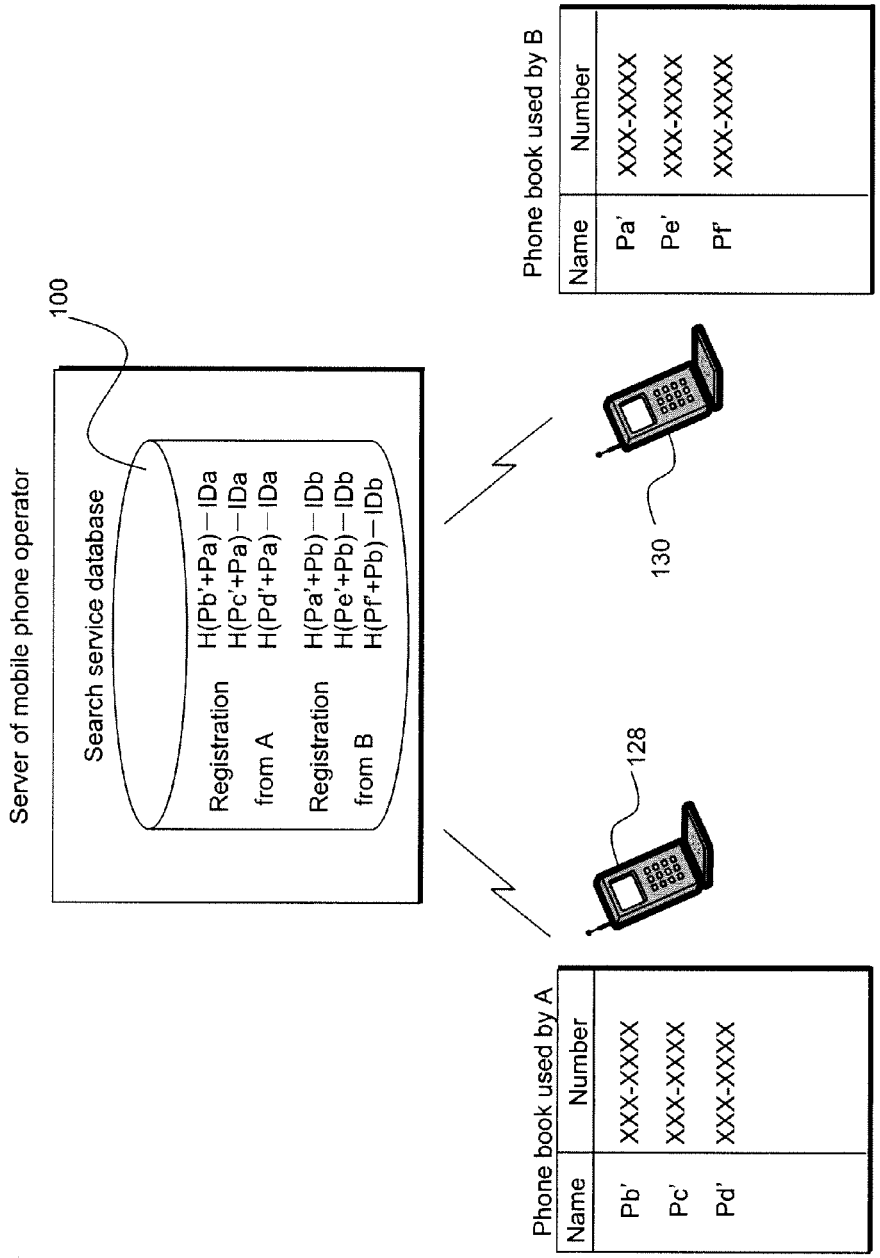
FIG. 12 shows the systems according to one embodiment of the present invention.

FIG. 12 is another embodiment of the present invention. Others personal information, such as IP telephone, mobile phone, names and telephone numbers in the telephone book of the terminal used by the communication terminal's user, currently being used, is obtained by the user of each terminal themselves and accumulated by a different communication method such as orally or electronic mail according to conventional methods. Therefore, in a conventional method, the personal information in these telephone books is used only within the terminal, for example, a search based on information which is accumulated in a telephone book and is not used by various network services other than telephone calls. Others information held in the telephone book accumulated in each terminal is supposed to be used only by the terminal owner and according to the conventional method if this information is used in a search or network service then it is necessary to reveal this to a mobile phone provider for example.

In the system and method of the present invention related to this embodiment shown in FIG. 12, A's information terminal and B's information terminal are each mobile phones 128 and 130 respectively. Further, in the present embodiment, A's information terminal and B's information terminal will each be explained as mobile phones 128 and 130 respectively, however, it is not limited to these and can be an information terminal of an optional type such as PDA, note computer, game device or camera.

In the system and method of the present invention related to this embodiment, as shown in FIG. 12, A's information terminal 128 forms a hash value H(Pb'+Pa), H(Pc'+Pa), H(Pd'+Pa) of the combination of A's own name Pa and the names Pb', Pc', Pd' which are people in the telephone number book of A's information terminal 128, correlates with connection information such as A's telephone number, sends this to the server 100 of the mobile phone provide and memorizes, stores and registers in advance in database 102. Also, B's information terminal 130 forms a hash value H(Pa'+Pb), H(Pe'+Pb), H(Pf'+Pb) of the combination of B's own name Pb and the names Pa', Pe', Pf' which are people in the telephone number book of B's information terminal 130, correlates with connection information such as B's telephone number, sends this to the server 100 of the mobile phone provider and memorizes, stores and registers in advance in database 102. Similar to this, from the information of an optional IP telephone which uses this network service or the information of a mobile phone user, a hash combination of each partner registered in the mobile phone book and the terminal owner is formed in the same way as A's information terminal 128 and B's information terminal 130 and is this is sent to the server 100 and memorized, stored and registered in advance in database 102.

In the example shown in FIG. 12, for example when A tries to search for B, A's information terminal 128 inquires the hash value H(Pa+Pb') with server 100 which is the search node. The server 100 verifies whether the hash value H(Pa'+Pb) which is sent from B's information terminal 130 matches the registered hash value. To this inquiry from A's information terminal 128, if the server 100 detects a match between the hash value H(Pa'+Pb) sent from B's information terminal 130 and the registered hash value, that is to say if (Pb'+Pa) =H(Pb+Pa') then by sending the connection information such as B's information terminal's telephone number to A's information terminal 128, a telephone calls becomes possible from A to B.

In this type of situation, each user does not need to reveal any information that the telephone book holds to the mobile phone provider and a search with a high level of safety can be realized because only a search from a partner who is registered in the telephone book of each mobile phone is permitted and moreover, a safe connection based on that search result can be realized.

Further, in embodiment 6 too, A or B used a calculation result via the hash function of the character string combination of their own names, however, the personal information which A or B use when performing a similar operation is not limited to names and can be any type of personal information such as addresses, age, telephone numbers, electronic mail address, occupation, place of work, schools attended and birth place etc.

Also, in embodiment 6, for example, once the operation of the combination of the character string of Pb' and Pa is performed the calculation result H(Pb'+Pa) is used, however, this calculation result can be an optional calculation result F(Pb', Pa) which is uniquely decided based on Pb' and Pa. This optional calculation F(Pb', Pa) can be a reversible calculation, that is Pb' and Pa can be calculated back from (Pb', Pa) or an irreversible calculation, that is Pb' and Pa cannot be calculated back from (Pb', Pa). However, in the case where an optional calculation used here is a reversible calculation then the level of security cannot be guaranteed. Also, this optional calculation F(Pb', Pa) can be a commutative calculation, that is F(Pb', Pa)=F(Pa,Pb') or a non-commutative calculation, that is F(Pb',Pa)≠F(Pa,Pb'). The hash calculation H(Pb',Pa) of the character string combination used in this embodiment is simply one example using a commutative or non-commutative calculation among optional calculation F(Pb'+Pa).

(Embodiment 7)

Figure 13:
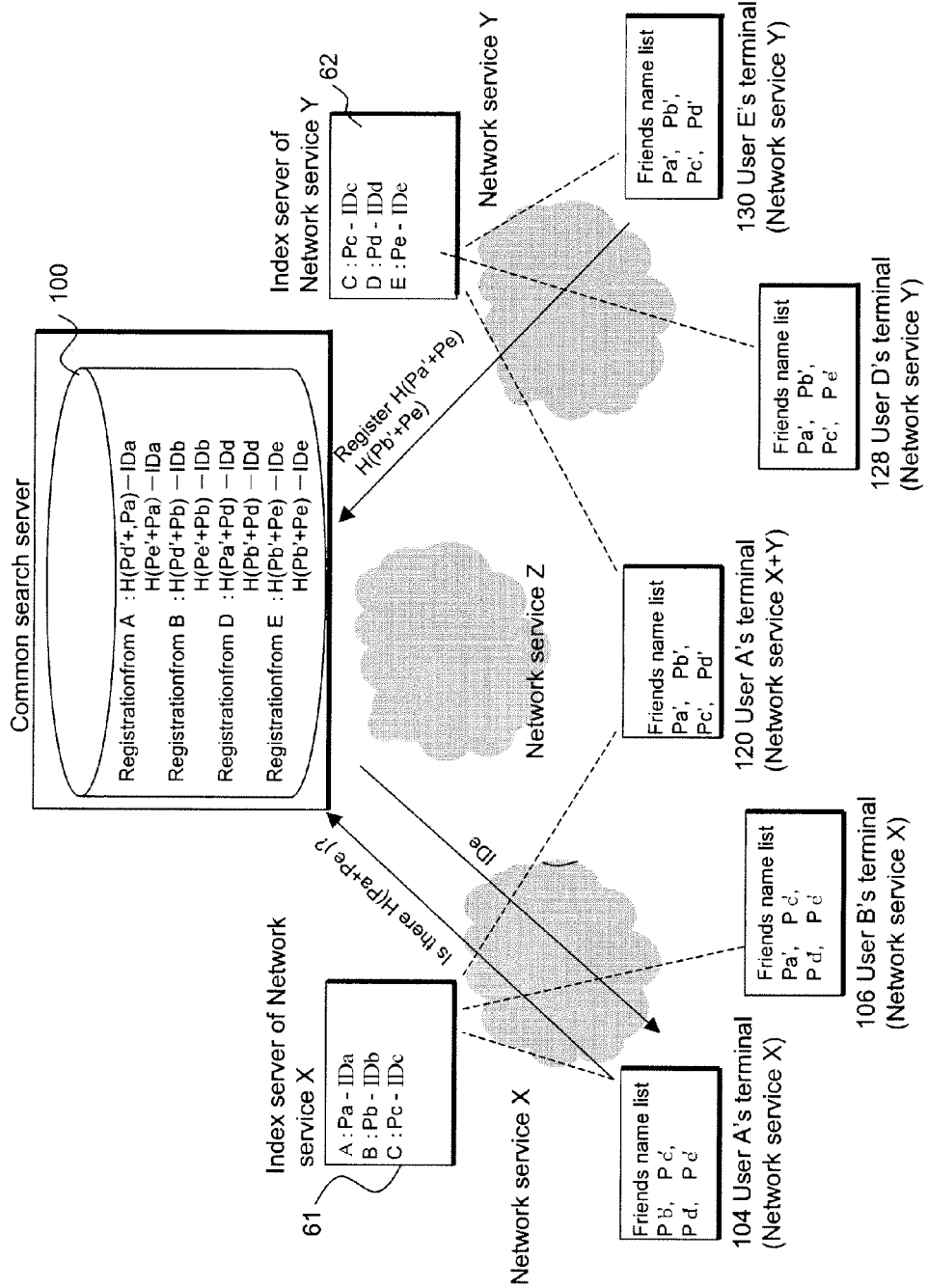
FIG. 13 shows the systems according to one embodiment of the present invention.

Using FIG. 13 one other embodiment of the present will be explained. As shown in FIG. 13, the information terminal of all the users A, B, C, D, E and F are connected to a network. User A, B and C's information terminal 104, 106 and 120 respectively conduct communication on the network service X. On the other hand, user C, D and E's information terminal 120, 128 and 130 respectively conduct communication on the network service Y. In the present embodiment, network service X and network service Y are each independent.

For example, when A, who is a user of network service X, searches for B, who is a user of network service X, the conventional methods are used. That is to say, A's information terminal 104 requests to the search index server 61 which network service X prepares, a search of the personal information itself which is held by A's information terminal 104 in advance and registered by user B's information terminal 106 in advance in this index server 61, when the index server 61 detects a match of B's personal information which is registered in advance by B and the search request from A's information terminal 104, it notifies A's information terminal 104 of B's identification tag over the network service X or the information required for a connection with B and via a relay mode or a direction connection by P2P etc, and communication is established from A's information terminal 104 to B's information terminal 106.

Also, even in the search among users of network Y, the searcher uses index server 62 of network sever Y and by a similar procedure as that stated above searches for the communication partner by the method which directly searches for the personal information itself of the conventional object of the search and after obtaining the information required for a connection on network service Y with the object of a search, establishes communication.

However, network service X and network service Y are independent network services. Therefore, under the conventional method a search is made between users of the independent network service and in order to establish communication, a database is formed which integrated connection information with personal information, which is used for a search, in the index server of both network service X and network service Y and the user of either network service X or network service Y requested a search to that integrated database or the release of the index server 62 of network service Y to the user of network service X, or alternatively, the release of the index server X of network service X to the user of network service Y, is indispensable.

For example, by the conventional method, the terminal 104 of A, who is the only user of network service X searches from the terminal 130 of E, who is the only user of network service Y and in order to establish communication A is required to inquire to a database where the index server of network service X and network service Y have been integrated, that is to say, a new database which includes all the connection information and personal information of users of X and Y, or A's terminal 104 needs to allow a search, verification and a request for the provision of connection information to the index server 62 of the network service Y. In other words, there is a problem that when connecting or searching between different network services, network service X and network service Y's independence cannot be maintained.

However, different network services are usually managed by different providers and user's personal information held in index servers are not only valuable property to the operators but the managing provider of the service has a duty to maintain secrecy regarding usual user's personal information. Because of this, by the conventional method the integration of the required index server or the release of the index server to the user of another protocol is in most cases not realistic in terms of business In the system and methods of the present invention related to embodiment 7, as shown in the example in FIG. 13, one embodiment of the present invention will be explained which offers an independence between different protocols and provides convenience of interconnection to users. Now, the users A, B, C, D, and E in FIG. 13, are all friends of each other and in the information terminals 104,106,120,128 and 130 of these users the names of the friends are registered in a friend name register. For example, in FIG. 13, C's name which is memorized and stored in A's terminal 104 is inscribed as Pc'

In the system and methods of the present invention related to embodiment 7, a common search server 100 is used in order to realize an interconnection between the user of network service X and the user of network server Y Now, the service which performs the interconnection from the result of a search carried out by this common search server is defined again as network service Z. A is in the register of friends names, however, the hash value H(Pd'+Pa) and H(Pe'+Pa) which is the calculation result via the hash function of the character string combination of D's name Pd', E's name Pe' and A's own name Pa, who are non users of network service X, is registered in the common search server 100. Similarly, B is H(Pd'+Pb) and H(Pe'+Pb), D is H(Pa'+Pd) and H(Pb'+Pd) and E is H(Pa'+Pe) and H(Pb'+Pe) 64, all of which are registered in the common search server 100. The registered user exceeds the network service X or the network service Y which each uses and the identification tags IDa, IDb, IDd, and IDe which alone can specify on the network service Z or the information required for a connection with the provider of the hash value is correlated with all of these hash values.

In this way, even if the hash value and the connection information is registered, in the common search server 100, only the hash value which is combined with the name correlated with the identification tag etc, is registered, the personal information of a user of network service X or a user of network service Y which are managed by the networks managers is not registered. Therefore, network service X and network service Y are independent and further, the manager of the common search server, that is, the manager of network service Z, has no method of obtaining personal information which is held by the managers of network service X or network service Y. Also, there is no need for any user to display personal information for searching purposes In this type of this situation, where A, who is a user of network service X and who searches for and wishes to connect with E who is a user of network service Y, will be explained. A's information terminal 104 sends the hash value H(Pa+Pe') of the character string combination of A's name Pa and A's partner's name Pe to the common search server 100, and requests a search 65. The common search server 100 detects a match with the hash value registered in advance by E, that is, H(Pa+Pe')=H(Pa'+Pe). As a result, once A's information terminal 104 is notified 67 of E's identification tag IDe on the independent network service Z or the information required for a connection with E is received from X and Y, A's information terminal 104 establishes communication with E's communication terminal 130 on the network service Z via a server or a P2P connection.

Further, also in embodiment 7, A or B, the calculation result via the hash function of the character string combination of A's or B's own name is used, however, the personal information used when A and B perform similar operations is not limited to names and can be any information such as addresses, age, telephone numbers, electronic mail addresses, occupation, place of work, schools attended and birthplaces. Also, the personal information combined in H(Pa+Pe') or H(Pa'+Pe) for example, as with users of the same name, does not have to be personal information of the same category. Further, the information used here does not have to be information which can specify an individual generally called personal information but may also be a password formed from general information decided in advance by the communicating users.

Also, in the present embodiment, for example, once the operation of the combination of the character string of Pb' and Pa is performed the calculation result H(Pb'+Pa) is used, however, this calculation result can be an optional calculation result F(Pb',Pa) which is uniquely decided based on Pb' and Pa. This optional calculation F(Pb',Pa) can be a reversible calculation, that is Pb' and Pa can be calculated back from (Pb',Pa) or an irreversible calculation, that is, Pb' and Pa cannot be calculated back from (Pb',Pa). However, in the case where the optional calculation used here is a reversible calculation, security is not guaranteed, as stated above. Also, this optional calculation F(Pb',Pa) can be a commutative calculation, that is F(Pb',Pa)=F(Pa,Pb') or a non-commutative calculation, that is F(Pb',Pa)≠F(Pa,Pb'). The hash calculation H(Pb',Pa) of the character string combination of this embodiment is simply one example using either a commutative or non-commutative calculation from among the optional calculations F(Pb',Pa).

In the communication between A's information terminal 104 and E's information terminal 130 following a search on the common search server, as stated above, from X, Y, the independent network service Z can be used on both network service X and network service Y can be used using C's terminal 68 which can communicate on both network service X and network service Y as a relay node. In this case also, there is no need to reveal personal information which the managers of each network service X and Y keep, to a third party including the manager of the common search server. In the situation where each manager's independence is maintained, an interconnection service which exceeds the network service can be proposed.

In FIG. 13, in the friends name register in each terminal, only the name of a user in a network service which one doesn't use and the hash value of ones own name is registered in the common search server 100, however, the hash value of ones own name and all the names which are in each friends name register including the friends which use the same network service, can be registered in advance in the common search server 100. Even in this way. The independence of each network service is similarly maintained and further, there is no need to reveal users personal information held by the each of the managers of the network service X and network service Y.

Also, in FIG. 13, the function which stores a users personal information and undertakes a search is managed centrally on the server such as an index server or common search server, however, the present invention can be applied even in a network where information is kept in multiple dispersed terminals and which performs searches such as in a P2P network, In this way, according to the present invention, because communication can be established safely and automatically between communicating terminals, various services can be realized based on the automatic exchange of information between communicating terminals.

What is claimed is:

1. A method of operating a server for providing a network service, said method comprising:
    receiving a first hash value F(Pa', Pb) from an information terminal of a user B having a first database containing personal information Pa' of a user A and personal information Pb of said user B, said first hash value being generated by a hash function applied to a connection of said personal information Pa' and said personal information Pb;
    correlating an identification tag of said user B with said first hash value F(Pa', Pb), said identification tag of said user B uniquely identifying said user B in said network service, and memorize said identification tag of said user B and said first hash value F(Pa', Pb);
    receiving a second hash value F(Pa, Pb') from an information terminal of said user A having a second database containing personal information Pa of said user A and personal information Pb' of said user B, said second hash value being generated by a hash function applied to a connection of said personal information Pa and said personal information Pb', and
    searching for a hash value which is equal to said second hash value F(Pa, Pb') and detect said identification tag of said user B by detecting said first hash value F(Pa', Pb), which is equal to and said second hash value F(Pa', Pb), and
    sending said identification tag of said user B to said information terminal of said user A on a detection of said first hash value F(Pa', Pb), which is equal to said second hash value F(Pa, Pb').

2. The method of operating a server according to claim 1, wherein, said first hash value is a hash value F(*, Pb) of the same wild card information * memorized in both said information terminal of said user A and said information terminal of said user B and said personal information Pb, and said second hash value is a hash value F(*, Pb') of said wild card information * and said personal information Pb'.

3. The method of operating a server of claim 1, said server further comprising:
    software configured on an information terminal of a user A, that memorizes information P1a, P2a, . . . , Pna (n is an integer) of said user A and information P1b', P2b', . . . , Pmb' (m is an integer) of a user B; and
    software configured on an information terminal of said user B, that memorizes information P1a', P2a', . . . , Pna' of said user A and information P1b, P2b, . . . , Pmb of said user B;
    wherein said software configured on information terminal of said user B generates one or more first hash values by a hash function applied to optionally combined said information P1a', P2a', . . . , Pna' of said user A and said information P1b, P2b, . . . , Pmb of said user B and sends said first hash value to said server, and
    wherein said software configured on information terminal of said user A generates one or more second hash values by a hash function applied to optionally combined said information P1a, P2a, . . . , Pna of said user A and said information P1b', P2b', . . . , Pmb' of said user B and sends said second hash value to said server.

4. The method of operating a server according to claim 3 wherein said first hash value is one or more among F(P1a', P1b), F(P1a', P2a', P1b, P2b), . . . , F(P1a', P2a', . . . , Pna', P1b, P2b, . . . , Pmb) and said second hash value is one or more among F(P1b', P1a), F(P1b', P2b', P1a, P2a), . . . , F(P1b', P2b', . . . , Pmb', P1a, P2a, . . . , Pna).

5. The method of operating a server according to claim 3, wherein said first hash value is one or more results calculated by said hash function applied to optionally combining one among said information P1a', P2a', . . . , Pna' of said user A and one among said information P1b, P2b, . . . , Pmb of said user B, and said second hash value is one or more results calculated by said hash function applied to optionally combining one among said information P1a, P2a, . . . , Pna of said user A and one among said information P1b', P2b', . . . , Pmb' of said user B.

6. The method of operating a server according to claim 1, in association with an information terminal comprising:
    calculation means which generates one or more first hash values calculated by a hash function applied to optionally combined information Pa, P2a, . . . , Pna (n is an integer) of a user A and information P1b', P2b', . . . , Pmb' (m is an integer) of a user B;
    sending means which sends said first hash value to the server, and;
    receiving means, wherein said server correlates one or more second hash values calculated by said hash function applied to a connection of said information Pa', P2a', . . . , Pna' (n is an integer) of said user A and said information Pb, P2b, . . . , Pmb (m is an integer) of said user B with said identification tag of said user B, and memorizes said second hash value and said identification tag of said user B, and searches for an hash value which is equal to said first hash value which is sent from said information terminal of said user A, said receiving means receiving said identification tag of said user B by detecting said first hash value, which is equal to said second hash value.

7. The method of operating a server according to claim 6, wherein said first hash value is one or more among F(P1a', P1b), F(P1a', P2a', P1b, P2b), . . . , F(P1a', P2a', . . . , Pna', P1b, P2b, . . . , Pmb) and said second hash value is one or more among F(P1b', P1a), F(P1b', P2b', P1a, P2a), ..., F(P1b', P2b', ..., Pmb', P1a, P2a, ..., Pna).

8. The method of operating a server according to claim 6, wherein said first hash value is one or more results calculated by said hash function applied to optionally combining one among said information P1a, P2a, ..., Pna of said user A and one among said information P1b', P2b', ..., Pmb' of said user B, and said second hash value is one or more results calculated by said irreversible calculation of optionally combining one among said information P1a', P2a', ..., Pna' of said user A and one among said information P1b, P2b, ..., Pmb of said user B.

9. A server providing a network service, said server comprising a data processor, said data processor receiving a first hash value F(Pa', Pb) which is calculated by a hash function applied to a connection of personal information Pa' of a user A and personal information Pb of a user B, said first hash value F(Pa', Pb) being generated in the information terminal of said user B having a first database containing said personal information Pa' and said personal information Pb, and correlating an identification tag of said user B with said first hash value F(Pa', Pb), said identification tag of said user B uniquely identifying said user B in said network service, and memorizing said identification tag of said user B and said first value F(Pa', Pb), wherein said server receives a second hash value F(Pa, Pb') which is calculated by said hash function applied to a connection of said personal information Pa of said user A and said personal information Pb' of said user B, said second hash value F(Pa, Pb') being generated in said information terminal of said user A having a second database containing said personal information Pa and said personal information Pb', and searches for a hash value which is equal to said second hash value F(Pa, Pb') and detects said identification tag of said user B by detecting said first hash value F(Pa', Pb), which is equal to said second hash value F(Pa, Pb'), and sends said identification tag of said user B to said information terminal of said user A.

10. An information terminal comprising:
a first database containing personal information Pa of a user A and personal information Pb' of a user B;
calculation means which generates a first hash value F(Pa, Pb') calculated by a hash function applied to a connection of said personal information Pa of said user A and said personal information Pb' of said user B;
sending means which sends said first hash value F(Pa, Pb') to a server providing a network service, and;
receiving means, wherein said server correlates a second hash value F(Pa', Pb) calculated by said hash function applied to a connection of said information Pa' of said user A and said information Pb of said user B with said identification tag of said user B, said second hash value F(Pa' Pb) being calculated in an information terminal of said user B having a second database containing said personal information Pa' and said personal information Pb, said identification tag of said user B uniquely identifying said user B in said network service, memorizes said second hash value F(Pa', Pb) and said identification tag of said user B, and searches for a hash value which is equal to said first hash value F(Pa, Pb') which is sent from said information terminal of said user A, said receiving means receiving said identification tag of said user B by detecting said first hash value F(Pa, Pb'), which is equal to said second hash value F(Pa', Pb).

11. The information terminal according to claim 10, wherein, said first hash value is a hash value F(*, Pb') of the same wild card information * memorized in both said information terminal of said user A and said information terminal of said user B and said personal information Pb, and said second hash value is an hash value F(*, Pb) of said wild card information * and said personal information Pb'.

12. The information terminal according to claim 10, which is associated with a server comprising a data processor, said data processor configured to receive one or more hash values calculated by a hash function applied to optionally combined information P1a', P2a', ..., Pna' (n is an integer) of a user A and information P1b, P2b, ..., Pmb (m is an integer) of a user B, said result being generated in an information terminal of said user B, and correlate an identification tag of said user B with said hash values and memorizing said identification tag of said user B with said hash values.

13. The information terminal according to claim 12, wherein said server is further configured to receive one or more second hash values calculated by said irreversible calculation of said information P1a, P2a, ..., Pna of said user A and said information P1b', P2b', ..., Pmb' of said user B, said second hash value being generated in said information terminal of said user A, and search for an hash value which is equal to said second hash value, and detect said identification tag of said user B by detecting said first hash value, which is equal to said second hash value, and send said identification tag of said user B to said information terminal of said user A.

14. The information terminal according to claim 12, wherein said first hash value is one or more among F(P1a', P1b), F(P1a', P2a', P1b, P2b), ..., F(P1a', P2a', ..., Pna', P1b, P2b, ..., Pmb) and said second hash value is one or more among F(P1b', P1a), F(P1b', P2b', P1a, P2a), ..., F(P1b', P2b', ..., Pmb', P1a, P2a, ..., Pna).

15. The information terminal according to claim 12, wherein said first hash value is one or more results calculated by said hash function applied to optionally combining one among said information P1a, P2a, ..., Pna of said user A and one among said information P1b', P2b', ..., Pmb' of said user B, and said second hash value is one or more results calculated by said hash function applied to optionally combining one among said information P1a', P2a', ..., Pna' of said user A and one among said information P1b, P2b, ..., Pmb of said user B.

16. The information terminal according to claim 10, which is associated with a server comprising a data processor, said data processor is configured to receive a first hash value which corresponds to flag information which is correlated with information of a user B, said information of user B being used in each of one or more of said first hash values calculated by a hash function applied to optionally combined information P1a', P2a', ..., Pna' of a user A and information P1b, P2b, ..., Pmb of said user B, said first hash value being generated in an information terminal of said user A, and correlating said first hash values with said identification tag of said user B, and memorize said first hash values with said identification tag of said user B.

17. The information terminal according to claim 16, wherein said server is further configured to receive one or more second hash values calculated by said hash function applied to optionally combined information P1a, P2a, ..., Pna of said user A and information P1b', P2b', ..., Pmb' of said user B, said second hash value being generated in said information terminal of said user A, and said server searches for an hash value which is equal to said second hash value, and said server detects said identification tag of said user B and said flag information of said user B by detecting said first hash value, which is equal to said second hash value, and to send said identification tag of said user B to said information terminal of said user A.

18. The information terminal according to claim 16, wherein said one or more first hash values include a number of one or more of said flag information which is correlated with each of said first hash values respectively.

19. A method comprising:
generating a first hash value F(Pa, Pb') calculated by a hash function applied to a connection of personal information Pa of a user A and personal information Pb' of a user B in an information terminal of said user A having a first database containing said personal information Pa and said personal information Pb';
sending said first hash value F(Pa, Pb') to a server providing a network service, and;
at said server, (a) correlating a second hash value F(Pa', Pb) calculated by said hash function applied to a connection of said personal information Pa' of said user A and said personal information Pb of said user B with an identification tag of said user B, said second hash value F(Pa' Pb) being calculated in an information terminal of said user B having a second database containing said personal information Pa' and said personal information Pb, said identification tag of said user B identifying said user B uniquely in said network service, (b) memorizing said second hash value F(Pa', Pb) and said identification tag of said user B, and (c) searching for an hash value which is equal to said first hash value F(Pa, Pb') which is sent from said information terminal of said user A; and
receiving said identification tag of said user B by detecting a match between said first hash value F(Pa, Pb') and said second hash value F(Pa', Pb).

20. The method according to claim 19, wherein said first hash value is an hash value F(*, Pb') of the same wild card information * memorized in both said information terminal of said user A and said information terminal of said user B and said personal information Pb, and said second hash value is an hash value F(*, Pb) of said wild card information * and said personal information Pb'.

\* \* \* \* \*

UNITED STATES PATENT AND TRADEMARK OFFICE
CERTIFICATE OF CORRECTION

PATENT NO.        : 8,825,738 B2
APPLICATION NO.   : 11/961646
DATED             : September 2, 2014
INVENTOR(S)       : Naono et al.

It is certified that error appears in the above-identified patent and that said Letters Patent is hereby corrected as shown below:

In the Claims,

Column 39:
Line 58 (claim 1, line 25), after "second hash value", change "F(Pa', Pb)," to -- F(Pa, Pb'), --.

Column 40:
Line 46 (claim 6, line 5), after "combined information", change "P$a$," to -- P1$a$, --.
Line 53 (claim 6, line 12), after "said information", change "P$a$'," to -- P1$a$', --.
Line 55 (claim 6, line 14), after "information", change "P$b$," to -- P1$b$, --.

Column 41:
Line 52 (claim 10, line 15), change "F(Pa ' Pb)" to -- F(Pa', Pb) --.

Signed and Sealed this
Ninth Day of December, 2014

Michelle K. Lee
*Deputy Director of the United States Patent and Trademark Office*